US009828529B2

(12) United States Patent
Attarwala

(10) Patent No.: US 9,828,529 B2
(45) Date of Patent: Nov. 28, 2017

(54) CYANOACRYLATE COMPOSITIONS IN NON-FLOWABLE FORMS

(71) Applicant: Henkel IP & Holding GmbH, Duesseldorf (DE)

(72) Inventor: Shabbir Attarwala, Simsbury, CT (US)

(73) Assignee: Henkel IP & Holding GmbH, Duesseldorf (DE)

(*) Notice: Subject to any disclaimer, the term of this patent is extended or adjusted under 35 U.S.C. 154(b) by 0 days.

(21) Appl. No.: 15/233,313

(22) Filed: Aug. 10, 2016

(65) Prior Publication Data

US 2016/0362581 A1 Dec. 15, 2016

Related U.S. Application Data

(60) Division of application No. 13/051,400, filed on Mar. 18, 2011, now Pat. No. 9,457,613, which is a continuation of application No. PCT/US2009/058129, filed on Sep. 24, 2009.

(60) Provisional application No. 61/100,474, filed on Sep. 26, 2008.

(51) Int. Cl.
| B43M 11/06 | (2006.01) |
| C09J 4/06 | (2006.01) |
| C09J 9/00 | (2006.01) |
| C08K 5/103 | (2006.01) |
| C08L 33/14 | (2006.01) |

(52) U.S. Cl.
CPC ............... *C09J 4/06* (2013.01); *B43M 11/06* (2013.01); *C09J 9/005* (2013.01); *C08K 5/103* (2013.01); *C08L 33/14* (2013.01)

(58) Field of Classification Search
CPC ............. C09J 4/06; C09J 9/005; B43M 11/06
USPC .......................................................... 401/261
See application file for complete search history.

(56) References Cited

U.S. PATENT DOCUMENTS

| 3,547,851 A | 12/1970 | Frauenglass |
| 3,742,018 A | 6/1973 | O'Sullivan |
| 3,846,363 A | 11/1974 | Ando et al. |
| 4,170,585 A | 10/1979 | Motegi et al. |
| 4,314,924 A | 2/1982 | Haubennestel et al. |
| 4,450,265 A | 5/1984 | Harris |
| 4,497,916 A | 2/1985 | Cooke et al. |
| 4,533,422 A | 8/1985 | Litke |
| 4,639,475 A | 1/1987 | Dierichs et al. |
| RE32,889 E | 3/1989 | Litke |
| 4,837,260 A | 6/1989 | Sato et al. |
| 5,371,131 A | 12/1994 | Gierenz et al. |
| 5,433,775 A | 7/1995 | Gardenier et al. |
| 6,294,629 B1 | 9/2001 | O'Dwyer et al. |
| 6,451,927 B1 * | 9/2002 | Haas ........................ C09J 4/06 428/35.7 |

(Continued)

FOREIGN PATENT DOCUMENTS

| CA | 2353605 | 6/2000 |
| DE | 19957677 | 6/2000 |

(Continued)

*Primary Examiner* — Tuan N Nguyen
(74) *Attorney, Agent, or Firm* — Steven C. Bauman

(57) ABSTRACT

The present invention relates to cyanoacrylate compositions in non-flowable and gel forms. More particularly, the present invention relates to non-flowable cyanoacrylate compositions which can be packaged in a convenient pocket-sized applicator dispenser for use in spreading the cyanoacrylate compositions onto substrates.

3 Claims, 16 Drawing Sheets

(56) References Cited

U.S. PATENT DOCUMENTS

| | | |
|---|---|---|
| 6,475,331 B1 | 11/2002 | O'Connor et al. |
| 6,727,320 B2 | 4/2004 | Attarwala et al. |
| 6,797,107 B1 | 9/2004 | Kotzey |
| 2006/0094833 A1 | 5/2006 | McDonnell et al. |
| 2007/0092481 A1 | 4/2007 | Misiak et al. |

FOREIGN PATENT DOCUMENTS

| | | |
|---|---|---|
| EP | 0144178 | 6/1985 |
| EP | 0686681 | 12/1995 |
| JP | 54-103939 | 9/1976 |
| WO | 0032709 | 6/2000 |
| WO | 01/91915 | 12/2001 |
| WO | 2007/049258 | 5/2007 |

* cited by examiner

CYANOACRYLATE COMPOSITIONS IN NON-FLOWABLE FORMS

BACKGROUND OF THE INVENTION

Field of the Invention

The present invention relates to cyanoacrylate compositions in non-flowable forms. More particularly, the present invention relates to non-flowable cyanoacrylate compositions which can be packaged in a convenient pocket-sized applicator dispenser for use in spreading the cyanoacrylate compositions onto substrates.

Brief Description of Related Technology

Cyanoacrylate adhesive compositions, particularly α-cyanoacrylate compositions, cure very rapidly and can be used on a variety of substrates. Cyanoacrylate adhesive compositions are generally applied in drops of a low-viscosity liquid composition for adhesion at particular spot locations. The liquid compositions may include a thickener to provide a composition capable of being retained to a substrate while the composition is being cured. Thickeners include acrylate resins, such as polymethyl(meth)acrylate and polymethyl (meth)acrylate, polymeric alkylcyanoacrylates, cellulose esters, such as cellulose acetate and cellulose butyrate, and polyvinyl ethers, such as polyvinylmethyl ether. See U.S. Pat. No. 3,742,018. In many applications, however, the dispensing and application of low-viscosity compositions is cumbersome.

Fumed silicas have in the past been added to cyanoacrylate compositions to render the compositions thixotropic. See U.S. Pat. No. 4,533,422 and Re. 32,889, and U.S. Pat. No. 4,837,260. The thixotropic, fumed-silica-containing cyanoacrylate compositions are described as being in the form of a nonflowable gel which will not substantially move when placed on a substrate. These cyanoacrylate compositions may also contain thickeners, such as for the purpose of preventing the fumed silica from settling in the composition. Disclosed thickeners include poly(meth)acrylates, polycyanoacrylates, and poly(vinyl)acetates.

It is well known to formulate adhesives as "stick" compositions. The patent literature on stick adhesives is extensive and covers a broad range of adhesive types, from emulsion adhesives through solvent based adhesives, to contact adhesives as well as gelling and solidifying additives for the preparation of the sticks ranging from thermosetting through natural polymers to inert fillers. An example of one such adhesive stick is sold under the trade name PrittStick™ by Henkel KGaA. This is an emulsion-based adhesive.

A number of patent documents identify adhesive compositions that have been formulated as soft-solids, and in some cases sticks. For instance, U.S. Pat. No. 5,433,775 discloses an adhesive stick consisting of a water based preparation of starch derivatives and a soap gel as the shaping gel-forming component. See also U.S. Pat. No. 5,371,131.

U.S. Pat. No. 3,846,363 relates to an adhesive crayon composition containing a sorbitol-benzaldehyde reaction product as an additive. U.S. Pat. No. 4,639,475 discloses an adhesive stick composed of the reaction product of sorbitol and/or xylitol and benzaldehyde as the gel-forming composition together with an adhesive resin which is the reaction product of methyl vinyl ether/maleic acid anhydride copolymers with partially neutralized acid phosphate esters of non-ionic wetting agents of the lower alkylene oxide adduct type. Room temperature dimensionally stable cyanoacrylate compositions have also been prepared with condensation products of aldehydes and ketones with polyols, such as dibenzylidene sorbital. See International Patent Application Nos. WO 00/32709 and WO 01/91915, and Canadian Patent Application No. CA 2353605.

Japanese unexamined patent application laid open (Kokai) 51-103939 describes a stick-like epoxy adhesive and a stick-like epoxy hardening agent which is used therewith. The sticks in JP '939 seem to be obtained by suitably compounding a gelling agent and/or water and/or organic solvent with a liquid or solution type epoxy adhesive and a epoxy hardening agent.

German Patent Document DE 199 57 677 A1 (Henkel KGaA) describes a cyanoacrylate adhesive, coating or sealing material which also contains at least one condensation product of an aldehyde or ketone with a polyol. The adhesive may be in stick form.

Adhesive compositions have also been rendered non-flowable. For example, U.S. Pat. No. 4,497,916 discloses a continuous liquid phase non-cyanoacrylate adhesive composition to which is added solid wax-like particles dispersed therein. These particles may be chosen from polyethylene glycol materials having 4,000 to 20,000 molecular weight, stearic acid, acid waxes or stearic esters. The compositions disclosed in the '916 patent are formed by heating this combination of materials in slurry form and applying it, while heated, to threads. The composition then cools to obtain a non-mobile coating. This composition requires substantial preparation in order to obtain the composition and apply it on parts. U.S. Pat. No. 3,547,851 discloses anaerobic compositions which have been rendered non-flowable through the inclusion of various waxes.

U.S. Pat. No. 6,451,927 describes a non-flowable poly (meth)acrylate adhesive composition having a polymeric matrix in sufficient quantity where it is non-flowable at temperatures up to 180° F. (82° C.) while being dispensable at room temperature without the application of heat.

U.S. Pat. No. 6,797,107 describes an adhesive composition which comprises at least one cyanoacrylate monomer and at least one solidifying polymer. The adhesive composition is reportedly capable of polymerizing to form an adhesive polymer and before such polymerizing, the adhesive composition is reported to have a liquifying point within a specified temperature greater than about 20° C. and such polymerizing is reported to not substantially occur until the adhesive composition is liquefied. The adhesive composition is reported to be in solid form at room temperature and the solidifying polymer is said to be a homopolymer of a certain structural formula, an example of which being caprolactone, such as Tone Polyol P-767-E and Tone Polymer P-767 Pellets.

Recently, Henkel Corporation introduced a line of adhesive products in the form of a stick. For instance, LOCTITE QUICK STIK 248, 268, 668, 548, 536 and PST 561 are members of that product line. However, conspicuously absent from this product line is one based on cyanoacrylates. One reason for this is that cyanoacrylates are notoriously sensitive to premature polymerization or destabilization, which is because of the cure profile or physical characteristics of the cyanoacrylate.

And more recently, Loctite (R&D) Ltd. designed a cyanoacrylate composition set forth in U.S. Patent Application Publication No. 2007/0092481, which speaks to a cyanoacrylate composition comprising a) at least one α-cyanoacrylate compound; and b) a polymer material constructed from poly(ethylene glycol) and polybutylene terephthalate) sections.

Accordingly, it would be desirable to provide a thickening agent for use as a constituent in cyanoacrylates that can be used in a variety of concentrations without adversely affecting the shelf life of the cyanoacrylate while having a dramatic impact on the viscosity, permitting the formulation of cyanoacrylates in a variety of viscosities up to and including a non-flowable form, at room temperature.

Thus, there is a need for cyanoacrylate compositions in non-flowable and gel form, such as those that can be packaged in a convenient pocket-sized applicator dispenser for use in applying and spreading the cyanoacrylate compositions onto substrates.

SUMMARY OF THE INVENTION

In contrast to known cyanoacrylate adhesives, the present invention provides at least one cyanoacrylate compound in combination with a polymeric matrix present in an amount sufficient to render the composition non-flowable. The polymeric matrix may be selected from polyhydroxyalkylacrylates, hydroxy-modified aliphatic hydrocarbons (such as castor oil-based rheological additives), liquid polyester-based rheological additives and combinations thereof.

In one desired embodiment of the present invention a cyanoacrylate adhesive composition is provided which includes a room-temperature-flowable polymerizable cyanoacrylate monomer, a polymerization inhibitor, and a polymeric matrix material miscible or otherwise compatible with the monomer. The polymeric matrix and polymerizable component readily form a stable mixture or combination without phase separation of component parts.

In a further desirable embodiment the present invention provides a non-flowable adhesive composition, which includes a self-supporting combination of a room-temperature-flowable polymerizable cyanoacrylate monomer; a polymerization inhibitor; and a polymeric material miscible with the cyanoacrylate, and present in an amount sufficient to render the composition non-flowable at temperatures of at least about 120° F. (49° C.), desirably about 160° F. (71° C.) and more desirably up to about 180° F. (82° C.).

The present invention also contemplates a method of making the non-flowable cyanoacrylate adhesive composition, as well as a method of use.

The present invention also contemplates an article of manufacture. In this embodiment there is included a dispensing container for housing and dispensing a non-flowable adhesive composition. The container includes a generally elongate hollow body having first and second ends, with one of the ends having a dispense opening. The container houses an adhesive composition, which includes a room-temperature-flowable polymerizable cyanoacrylate monomer; a polymerization inhibitor; and a polymeric material miscible with the cyanoacrylate and the inhibitor and present in an amount sufficient to render the composition non-flowable at temperatures of at least about 120° F. (49° C.), desirably about 160° F. (71° C.) and more desirably up to about 180° F. (82° C.).

In practical applications, these compositions are provided in an applicator such that they can be conveniently dispensed to the desired location. On their own, the cyanoacrylate adhesive compositions are non-flowable at room temperature and at temperatures of at least about 120° F. (49° C.), desirably about 160° F. (71° C.) and more desirably up to about 180° F. (82° C.); the compositions are however flowable upon exertion of a force and/or under elevated temperature conditions such as above those noted above. For example, one convenient means of dispensing is a pocket-sized or hand-held lipstick-type container which can be easily carried by the mechanic or maintenance worker for use as needed. Such a dispenser solves the problem of spillage in the environment which can be particularly problematic where contamination sensitive parts are present or when migration of adhesive is generally undesirable.

DETAILED DESCRIPTION OF THE INVENTION

Figure 1:
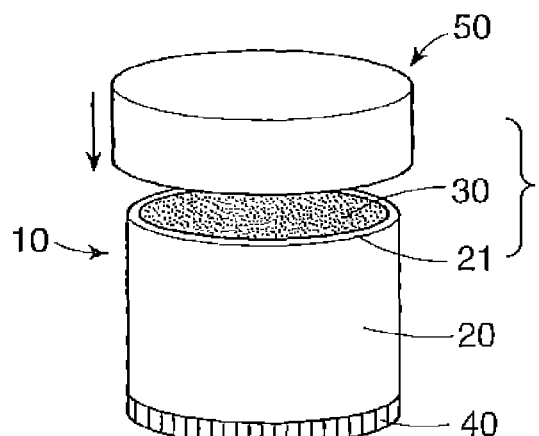
FIG. 1 is a perspective view of a lipstick-type dispenser container with a cap.

The compositions and articles of manufacture of the present invention include at least one α-cyanoacrylate The cyanoacrylate compositions of this invention as described above contain an α-cyanoacrylate monomer of the formula:

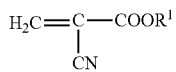

where $R^1$ represents a straight chain or branched chain alkyl group having 1 to 12 carbon atoms (which may be substituted with a substituent such as a halogen atom or an alkoxy group), a straight chain or branched chain alkenyl group having 2 to 12 carbon atoms, a straight chain or branched chain alkynyl group having 2 to 12 carbon atoms, a cycloalkyl group, an aralkyl group or any aryl group. Specific examples of $R^1$ are a methyl group, an ethyl group, an n-propyl group, an isopropyl group, an n-butyl group, an isobutyl group, a pentyl group, a hexyl group, an allyl group, a methallyl group, a crotyl group, a propargyl group, a cyclohexyl group, a benzyl group, a phenyl group, a cresyl group, a 2-choroethyl group, a 3-choropropyl group, a 2-chorobutyl group, a trifluoroethyl group, a 2-methoxyethyl group, a 3-methoxybutyl group and a 2-ethoxyethyl group. Ethyl cyanoacrylate is the preferred monomer for use in the inventive compositions.

A single α-cyanoacrylate monomer or a mixture of two or more of these α-cyanoacrylate monomers can be used. Generally, the above α-cyanoacrylate monomer used alone as an adhesive, and one or more components such as those set forth below, are used to formulate a commercial composition. The additional components includes, but are not limited to, accelerators; anionic polymerization inhibitors; radical polymerization inhibitors; thickeners; additives, such as plasticizers, heat stabilizers and toughening agents; and/ or perfumes, dyes, and pigments.

A suitable amount of α-cyanoacrylate monomer present in the adhesive composition is about 50 to 99.5% by weight, preferably 60 to 90% by weight, based on the total weight of the adhesive composition.

An anionic polymerization inhibitor is generally added to the α-cyanoacrylate type adhesive composition, e.g., in an amount of about 0.0001 to 10% by weight based on the total weight of the adhesive composition, to increase the stability of the adhesive composition during storage. Non-limiting examples of useful inhibitors include sulfur dioxide, sulfur trioxide, nitric oxide, hydrogen fluoride, organic sultone inhibitors, boron trifluoride and methane sulfonic acid, aromatic sulfonic acids, aliphatic sulfonic acids, and sulfones. The amount of inhibitor will, suitably be any convenient amount in order to slow down cure of the composition. Desirably, inhibitors of anionic polymerization are present at about 0.0001% to about 0.1% by weight of the adhesive composition.

Suitable examples of radical polymerization inhibitors include, for example, hydroquinone and hydroquinone monomethyl ether. A radical polymerization inhibitor is added, e.g., in an amount of about 0.001 to 2.0% by weight, particularly 0.03 to 0.5% by weight, based on the total weight of the adhesive composition, for the purpose of capturing radicals which are formed by light during storage.

The present invention includes the presence of the polymeric matrix in amounts of about 2.5% to about 20%, for instance about 5% to about 15%, such as about 7% to about 10%, by weight of the total composition. When present in these amounts, the non-flowability characteristics of a composition can be obtained with minimal undesirable effects, such as loss of substantial tensile properties. Additionally, these materials can be added directly in solid form, such as in powder or particulate form, without pre-melting of the particles or even heating of the polymerizable materials. It is often practical, however, to slightly heat the polymerizable materials before or after incorporating the polymeric matrix for the sake of expediency. This is not necessary to obtain the non-flowable characteristics but is used as a practical and expedient processing measure.

Specific polymeric materials useful herein as the polymeric matrix include hydroxyl modified aliphatic hydrocarbons and liquid polyester-based rheological additives. Hydroxy modified aliphatic hydrocarbons include THIXCIN E, THIXCIN R, THIXCIN GR, THIXATROL ST and THIXATROL GST available from Rheox Inc., Hightstown, N.J. These modified aliphatic hydrocarbons are castor oil based materials. The hydroxyl modified aliphatic hydrocarbons are partially dehydrated castor oil or partially dehydrated glycerides of 12-hydrostearic acid.

The polymeric matrix includes an organic material which generally has a melting point or softening point range in the range of about 200° F. (93° C.) to about 500° F. (260° C.), more desirably greater than 250° F. (121° C.) to about 500° F. (260° C.). Polymeric materials useful in the present invention may be selected from hydroxy modified aliphatic hydrocarbons (such as castor oil-based rheological additives), and combinations thereof.

In addition, the polymeric matrix may further include polyhydroxyalkylaciylates.

The cyanoacrylate composition in non-flowable form may also be present in a multi-part arrangement, such as a two part arrangement. See e.g. FIGS. 25-30.

In such case, the cyanoacrylate component should be placed in one chamber and an accelerator should be placed in another chamber of the container. The polymeric matrix for the cyanoacrylate component should be selected from one of the materials identified above. The polymeric matrix for the accelerator may be the same or different and may be selected from one or more of the recited materials above. Or, the polymeric matrix may be selected from urea-urethanes, amine modified aliphatic hydrocarbons, polyamides, polyacrylamides, polyimides, or liquid polyester-amide based rheological additives. Of particular utility are polyamide materials having a melting point of about 260° F. (127° C.). One such polyamide is commercially available as a non-reactive free flowing powder under the tradename DISPAR-LON 6200, from King Industries Specialties Company, Norwalk, Conn. Other polyamides include DISPARLON 6100 and 6500. The recommended use in accordance with commercially available data sheets for DISPARLON 6200 is for epoxy adhesive and potting compounds in amounts of about 0.5% to about 3% by weight; the recommended use in accordance with commercially available data sheets for DISPARLON 6500 is for epoxy adhesive and potting compounds in amounts of about 0.5% to about 3% by weight.

The polyamide materials desirably have a particle size less than about 15 microns, although other particle sizes are useful. As previously mentioned, the melting or softening point of the polymeric matrix materials ranges from about 200° F. (93° C.) to about 500° F. (260° C.). In a particularly desirable embodiment, a polyamide having a melting point of about 250° F.-270° F. (121° C.-132° C.) and desirably about 260° F. (127° C.) is employed.

A more particular description of a urea-urethane includes a combination of an alkali metal cation and the reaction product of (a) a polyfunctional isocyanate and an hydroxy and an amine; or (b) a phosgene or phosgene derivative, and a compound having 3 to 7 polyethylene ether units terminated at one end with an ether group and at the other end with a reactive functional group selected from an amine, an amide, a thiol or an alcohol; or (c) a monohydroxy compound, a diisocyanate and a polyamine. When the reaction product described in (c) is employed it is generally formed by first reacting a monohydroxy compound with a diisocyanate to form a mono-isocyanate adduct, and subsequently reacting the mono-isocyanate reaction product with a polyamine in the presence of an alkali metal salt and aprotic solvent, as described in U.S. Pat. No. 4,314,924, the disclosure of which is hereby expressly incorporated herein by reference. A commercially available version of the reaction product described in (c) is believed to be BYK-410, from BYK-Chemie, Wallingford, Conn. BYK-Chemie describes this reaction product as a urea-urethane.

Useful isocyanates for forming the reaction product(s) of the additive include polyisocyanates such as phenyl diisocyanate, toluene diisocyanate, 4,4'-diphenyl diisocyanate, 4,4'-diphenylene methane diisocyanate, dianisidine diisocyanate, 1,5-naphthalene diisocyanate, 4,4'-diphenyl ether diisocyanate, p-phenylene diisocyanate, 4,4'-dicyclo-hexyl-methane diisocyanate, 1,3-bis-(isocyanatomethyl) cyclohexane, cyclohexylene diisocyanate, tetrachlorophenylene diisocyanate, 2,6-diethyl-p-phenylenediisocyanate, and 3,5-diethyl-4,4'-diisocyanatodiphenylmethane. Still other polyisocyanates that may be used are polyisocyanates obtained by reacting polyamines containing terminal, primary and secondary amine groups or polyhydric alcohols, for example, the alkane, cycloalkane, alkene and cycloalkane polyols such as glycerol, ethylene glycol, bisphenol-A, 4,4'-dihydroxy-phenyldimethylmethane-substituted bisphenol-A, and the like, with an excess of any of the above-described isocyanates.

Useful alcohols for reacting with the polyisocyanates also include polyethyl glycol ethers having 3-7 ethylene oxide repeating units and one end terminated with an ether or an ester, polyether alcohols, polyester alcohols, as well as alcohols based on polybutadiene. The specific type of alcohol chosen and the molecular weight range can be varied to achieve the desired effect. Generally, monohydroxy compounds, straight or branched chain aliphatic or cyclic primary or secondary alcohols containing $C_{5-25}$, and alkoxylated derivatives of these monohydroxy compounds are useful.

Phosgene and phosgene derivatives, such as bischloroformates, may be used to make the reaction product of the additive (c). These compounds are reacted with a nitrogen-containing compound, such as an amine, an amide or a thiol to form the adduct. Phosgenes and phosgene derivatives may also be reacted with an alcohol to form, the reaction product.

The alkali metal cations are usually provided in the form of a halide salt. For example, sodium, potassium and lithium halide salts are useful. In particular, sodium chloride, sodium iodide, sodium bromide, potassium chloride, potassium iodide, potassium bromide, lithium chloride, lithium iodide, lithium bromide and combinations thereof may be employed.

The reaction products of additive (c) of the present invention are usually present in and added to the composition with an alkali metal salt, in a solvent carrier. The solvents are desirably polar aprotic solvents in which the reaction to form the reaction product was carried out. For example, N-methyl pyrrolidone, dimethylsulfoxide, hexamethylphosphoric acid triamide, N,N-dimethylformamide, N,N,N',N'-tetramethylurea, N,N-dimethylacetamide, N-butylpyrrolidone, tetrahydrofuran and diethylether may be employed.

One particularly desirable additive is the combination of a lithium salt and a reaction product which is formed by reacting a monohydroxy compound with a diisocyanate compound to form a mono-isocyanate first adduct, which is subsequently reacted with a polyamine in the presence of lithium chloride and 1-methy-2-pyrrolidone to form a second adduct. A commercially available additive of this sort is sold by BYK Chemie, Wallingford, Conn. under the tradename BYK 410. This commercially available additive is described by BYK-Chemie product literature as being a urea urethane having a minor amount of lithium chloride present in a 1-methyl-2 pyrrolidone solvent.

Amines which can be reacted with phosgene or phosgene derivatives to make the reaction product include those which conform to the general formula $R^{11}$—$NH_2$, where $R^{11}$ is aliphatic or aromatic. Desirable aliphatic amines include polyethylene glycol ether amines. Desirable aromatic amines include those having polyethylene glycol ether substitution on the aromatic ring.

For example, commercially available amines sold under the tradename JEFFAMINE by Huntsman Corporation, Houston, may be employed. Examples include JEFFAMINE D-230, JEFFAMINE D-400, JEFFAMINE D-2000, JEFFAMINE T-403, JEFFAMINE ED-600, JEFFAMINE ED-900, JEFFAMINE ED-2001, JEFFAMINE EDR-148, JEFFAMINE XTJ-509, JEFFAMINE T-3000, JEFFAMINE T-5000, and combinations thereof.

The JEFFAMINE D series are diamine based products and may be represented by:

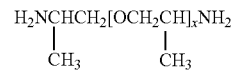

(CAS Registry No. 904610-0)
where x is about 2.6 (for JEFFAMINE D-230), 5.6 (for JEFFAMINE D-400) and 33.1 (for JEFFAMINE D-2000), respectively.

The JEFFAMINE T series are trifunctional amine products based on propylene oxide and may be represented by:

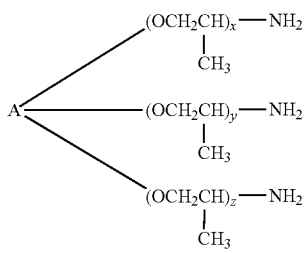

where x, y and z are set forth below in Table A.

TABLE A

| JEFFAMINE | | Approx. | |
|---|---|---|---|
| Product | Initiator (A) | Mol. Wt. | Mole % |
| T-403 | Trimethylolpropane | 440 | 5-6 |
| T-3000 | Glycerine | 3,000 | 50 |
| T-5000 | Glycerine | 5,000 | 85 |

More specifically, the JEFFAMINE T-403 product is a trifunctional amine and may be represented by:

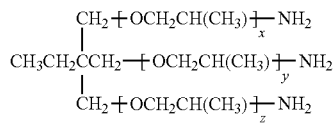

where x+y+z is 5.3. (CAS Registry No. 39423-51-3)

The JEFFAMINE ED series are polyether diamine-based products and may be represented by:

where a, b and c are set forth below in Table B.

TABLE B

| JEFFAMINE | Approx. Value | | Approx. |
|---|---|---|---|
| Product | B | a + c | Mol. Wt. |
| ED-600 | 8.5 | 2.5 | 600 |
| ED-900 | 15.5 | 2.5 | 900 |
| ED-2001 | 40.5 | 2.5 | 2,000 |

Amides useful for reacting with the phosgene or phosgene derivatives include those which correspond to the following formula:

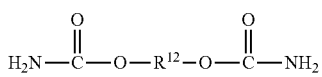

where $R^{12}$ may be an aliphatic or aromatic, substituted or unsubstituted, hydrocarbon or heterohydrocarbon, substituted or unsubstituted, having $C_{1-36}$.

Alcohols useful in forming the reaction product with the phosgene or phosgene derivatives include those described above.

Another polymeric matrix useful herein includes hydroxyl or amine modified aliphatic hydrocarbons and liquid polyester-amide based rheological additives. Hydroxy or amine modified aliphatic hydrocarbons include THIXCIN R, THIXCIN GR, THIXATROL ST and THIXATROL GST available from Rheox Inc., Hightstown, N.J. These modified aliphatic hydrocarbons are castor oil based materials. The hydroxyl modified aliphatic hydrocarbons are partially dehydrated castor oil or partially dehydrated glycerides of 12-hydrostearic acid. These hydrocarbons may be further modified with polyamides to form polyamides of hydroxyl stearic acid are described as being useful polyamides.

Liquid polyester-amide based rheological additives include THIXATROL TSR, THIXATROL SR and THIXATROL VF rheological additives available from Rheox Inc., Hightstown, N.J. These rheological additives are described to be reaction products polycarboxylic acids, polyamines, alkoxylated polyols and capping agents. Useful polycaboxylic acids include sebacic acid, poly(butadiene) dioic acids, dodecane dicarboxylic acid and the like. Suitable polyamines include diamine alkyls. Capping agents are described as being monocarboxylic acids having aliphatic unsaturation.

Thickeners, plasticizers, pigments, dyes, diluents, fillers, and other agents common to the art can be employed in any reasonable manner to produce desired functional characteristics, providing they do not significantly interfere with the monomer polymerization. TEFLON (polytetrafluoroethylene) and polyethylene are non-limiting examples.

As noted a thickener may be added to increase the viscosity of the α-cyanoacrylate adhesive composition; however, with the recited polymeric material, it may not be as desirable. Nevertheless, various polymers can be used as thickeners, and examples include poly(methyl methacrylate), methacrylate-type copolymers, acrylic rubbers, cellulose derivatives, polyvinyl acetate and poly(α-cyanoacrylate). A suitable amount of thickener is generally about 0.01 to 30% by weight, preferably 5 to 25% by weight based on the total weight of the cyanoacrylate adhesive composition.

Likewise, fumed silicas, hydrophobic silicas and certain fumed silica fillers treated with polydialkylsiloxanes or trialkylsilanes as described in U.S. Pat. No. 4,533,422 (Litke) may also be usefully employed in cyanoacrylate compositions as thickeners or thixotropes, e.g., in an amount of 0.01 to 20.0% by weight, preferably 5.0 to 20.0% by weight, based on the total weight of the cyanoacrylate adhesive composition. Again, however, with the recited polymeric material present, it may not be as desirable.

Perfumes, dyes, pigments, etc., may be added depending on use purposes in amounts which do not adversely affect the stability of the α-cyanoacrylate monomer. The use of such additives is within the skill of those practicing in the cyanoacrylate adhesive art and need not be detailed herein.

A cyanoacrylate accelerator may be used in a conventional manner such as in an amount of about 0.01 to 5.0% by weight, preferably 0.01 to 2.0% by weight, based on the total weight of the composition. Non-limiting examples of useful accelerators include calixarenes, oxacalixarenes, phthalic anhydride, non-ionic surface active agents, silacrowns, crown ethers and cyclodextrins, poly)ethyleneglycol) di(meth)acrylates and ethoxylated hydric compounds. See e.g. U.S. Pat. Nos. 4,170,585; 4,450,265; 6,294,629; and 6,475,331, the contents of which are all incorporated herein by reference.

Preparation of the compositions and products of the present invention can be achieved by simple admixture of the polymeric material into the polymerizable composition. Desirably, these constituents are mixed at about 1000 rpm under slightly elevated temperature conditions, for example, 80° C. to 100° C. The polymeric material may then be added, while maintaining the temperature at about 80° C. to 100° C. The actual temperature used may vary depending upon the melting point of the matrix material. After the polymeric material has been added, metallic powder and/or graphite may be added with the mixing speed increased to about 1500 rpm. The so-formed composition is dispensed into lipstick-type dispensers while hot. The dispensers are then allowed to cool to create the composition of the present invention. The polymeric material may be preheated to the above-described temperatures before its addition.

Mixing is performed for a time sufficient to incorporate the polymeric material, into the polymerizable composition, which can vary depending on the batch size. Generally, only seconds or minutes are required to achieve the desired blending in of the polymeric material. The composition will render itself non-flowable in approximately 2 to about 100 hours at room temperature depending on the nature of the polymerizable composition. This is due to the unique nature of the polymeric material, which is designed to be swellable and effectively form a branched matrix in situ. While not wishing to be bound by any particular hypothesis, it is believed that the particles of polymeric material retain their particulate nature, yet imbibe large amounts of the polymerizable composition. In doing so, they lend the non-flowable characteristics to the polymerizable composition, yet apply smoothly to a surface by virtue of its particulate nature. It appears that a portion of the matrix particle is solubilized which permits the imbibing, and a portion remains unsolubilized which allows for retention of its particulate form. After the polymeric material has been added, the so-formed composition may be dispensed into lipstick-type dispensers while hot. The dispensers are then allowed to cool to create the composition and article of manufacture of the present invention.

The present invention also contemplates an article of manufacture which includes the above-mentioned non-flowable cyanoacrylate adhesive composition in a dispenser container, with or without an optical applicator. Desirably, the dispenser is of a pocket-sized dimension such that it easily can be carried by the mechanic or maintenance worker in a pocket, apron or tool box without fear of spillage or contamination of sensitive parts and use it as needed.

The container is generally fitted with a cap which fits over and around the container walls.

At the container end opposite the dispense opening, i.e., the bottom end of the container is proximally located a mechanism for mechanically advancing the adhesive. These mechanisms are generally well known in the art and include a pusher means which can include a knob located at the bottom of the container which when turned in one direction advances the adhesive contained therein to the dispense opening and when turned in the other direction moves the cyanoacrylate adhesive in the opposite direction. This mechanism for mechanically advancing the cyanoacrylate adhesive composition creates a friction on the non-flowable cyanoacrylate adhesive compositions, which friction renders the composition free flowable while it is applied.

Figure 2:
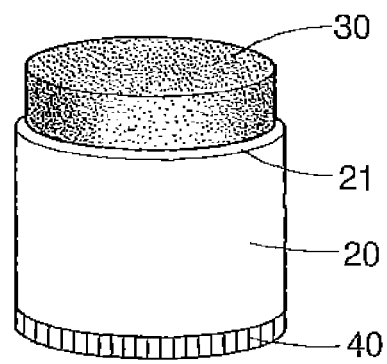
FIG. 2 is a perspective view of a lipstick-type container showing the adhesive composition contained therein.

More specifically, reference to FIGS. 1-30 depicts an article of manufacture in more particular detail. FIG. 1 shows dispense container 10 having a generally elongated tubular shape defined by wall 20 and having a dispense end defined by perimeter 21. Cap 50 as shown is designed for closingly engaging tubular wall 20 by fitting thereover. Composition 30 is shown in FIG. 1 within container 10. FIG. 2 shows composition 30 being advanced above perimeter 21 using knurled knob 40 whish was turned to advance the composition. Turning knob 40 in the opposite direction caused composition 30 to descend back within the container.

FIG. 1 shows container 10 having a generally elongate tubular shape defined by wall 20 and having a dispense end defined by perimeter 21. Cap 50 as shown is designed for closingly engaging tubular wall 20 by fitting thereover. Desirably, cap 50 engages the tubular wall 20 to provide a barrier against ambient humidity to prevent premature curing of the cyanoacrylate adhesive composition disposed within container 10. Metal tubular walls (not shown in FIG. 1, but shown as 23 in FIG. 4) or a metal sleeve, for example aluminum, within which the cyanoacrylate adhesive composition may be disposed and optionally metal caps, are useful. This metal sleeve further protects against premature polymerization. Composition 30 is shown in FIG. 1 within container 10. FIG. 2 shows composition 30 being advanced above perimeter 21 using knurled knob 40 which was turned to mechanically advance the composition within container 10. In one embodiment, knob 40 may be turned in the opposition direction to cause composition 30 to descend back within container 10.

Figure 3:
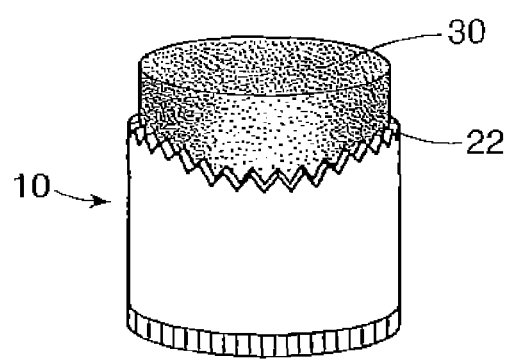
FIG. 3 is a perspective view of a dispenser container showing a notched rim at the dispense opening.
Figure 4:
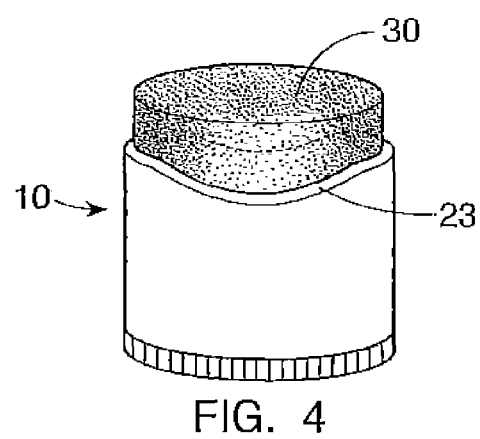
FIG. 4 shows a dispense container having a concave section at its dispense opening for receiving geometrically complimentary parts.
Figure 5:
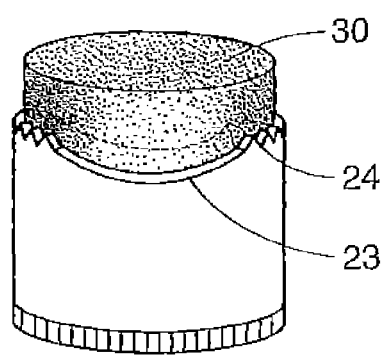
FIG. 5 shows a dispense container having both a concave section and a notched section at its dispense opening.

FIG. 3 shows container 10 as having a dispense end perimeter 22, which defines the opening, and has an alternative notched shape. Such a design could alternatively be sinusoidal or have other geometric shapes which can be tailored to the type of surface on which the composition is to be applied. For example, FIG. 4 shows container 10 having opposed concave surfaces in its perimeter 23 for accommodating parts having rounded surfaces such as a bolt, screw or rod-like parts. FIG. 5 shows a perimeter 24 with opposed concave surfaces in combination with notched sections.

Figure 6:
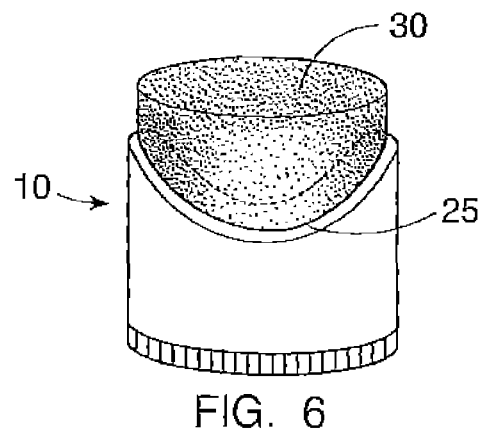
FIG. 6 is a perspective view of a dispensing container showing a more exaggerated concave section at its dispensing opening.

FIG. 6 shows a container 10 having more exaggerated opposed concave sections at its perimeter 25.

Figure 7:
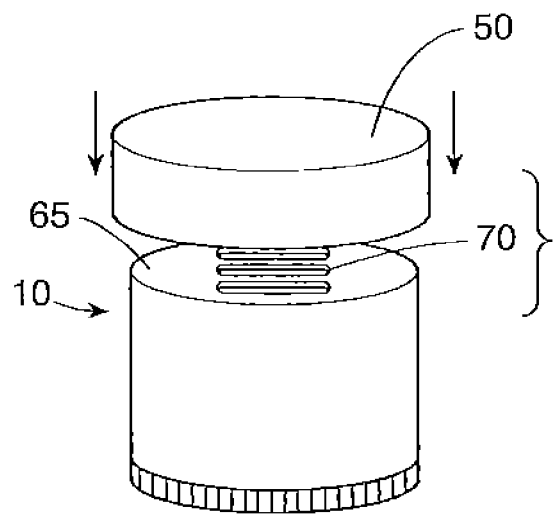
FIG. 7 is a perspective view of a container and cap showing the dispense opening defined by slotted apertures.

FIG. 7 shows a container 10 having a dispense end with end surface 65 and elongated apertures 70 through which the composition is dispensed.

Figure 8:
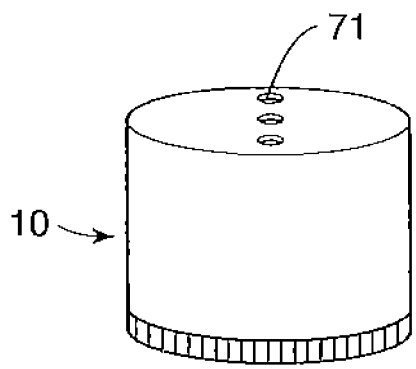
FIG. 8 shows a perspective view of a container and cap having the dispense opening defined by generally circular apertures.

FIG. 8 shows a different aperture shape in the form of generally circular apertures 71.

Figure 9:
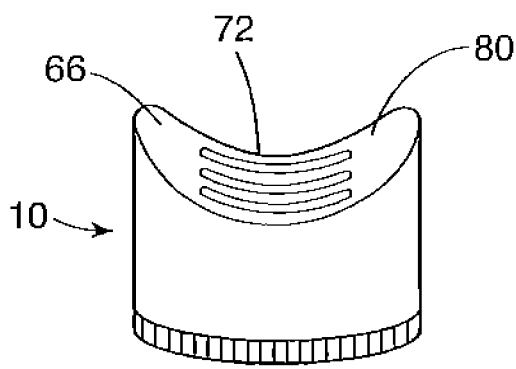
FIG. 9 is a perspective view of a dispense container and cap showing the dispense opening having a concave surface portion and slotted apertures therein.
Figure 10:
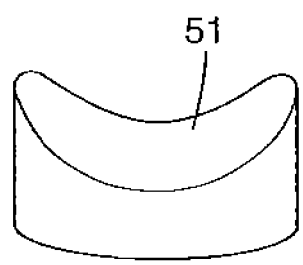
FIG. 10 is a perspective view of a cap for a dispense container with one end being concave.

FIG. 9 shows container 10 having an end surface 66 in which apertures 72 are both elongated and concave since they follow the geometry of the end surface 66. Cap 51 for this container (shown in FIGS. 9 and 10) fits around the perimeter 80 and may be designed with (FIG. 9) or without apertures (FIG. 10).

Figure 11:
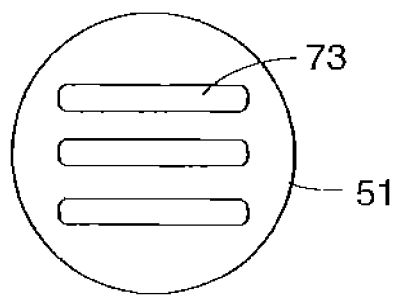
FIG. 11 shows a top view of the cap of FIG. 10 showing elongate apertures for dispensing compositions.

In FIG. 11, cap 51 is shown with elongated apertures 73 which can be opened or closed by closure means, not shown, and which can be fitted over perimeter 80.

Figure 12:
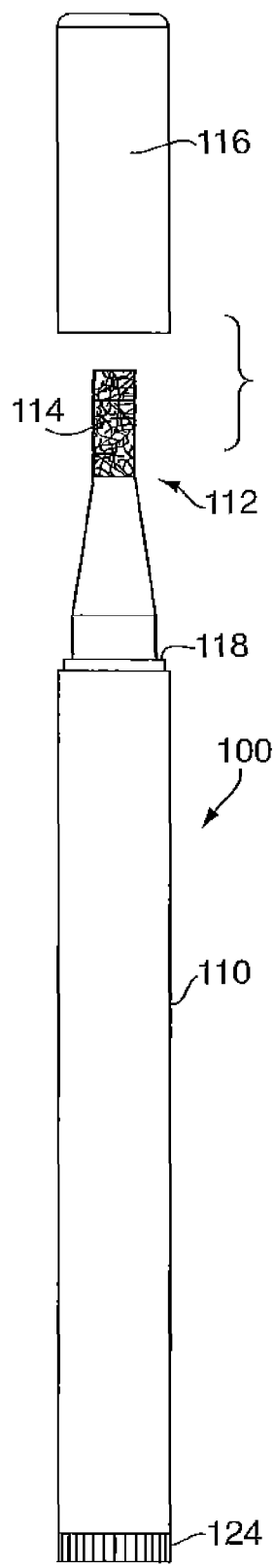
FIG. 12 shows an exploded plan view of an alternative embodiments of a lipstick-type dispenser container with a cap.
Figure 13:
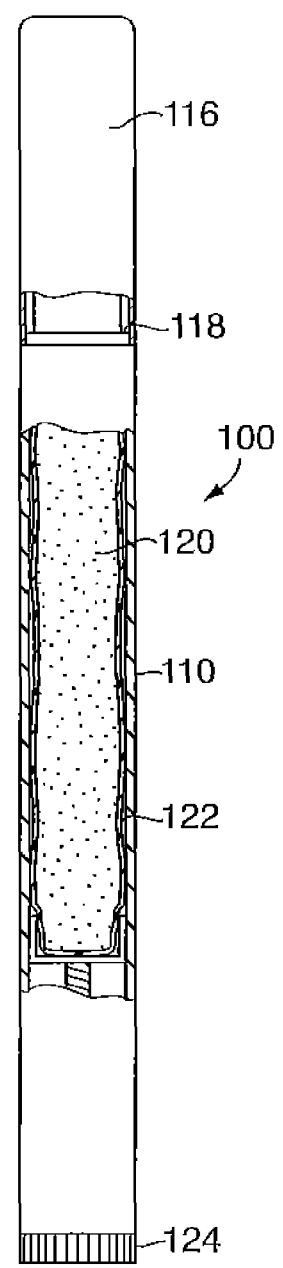
FIG. 13 shows a dispenser container, such as that of FIG. 1, partially in section, particularly identifying an interior collapsible liner within which is the non-flowable cyanoacrylate adhesive composition.

In an alternative embodiment, FIG. 12 shows a container 100 having a generally elongated tubular shape defined by wall 110 and having a dispense end 112 defined by a fiber tip dispenser 114. Cap 116 as shown is designed for closingly engaging tubular wall 110 by a pressure fit engagement with flange 118. Desirably, cap 116 engages the tubular wall 110 at flange 118 to provide a barrier against ambient humidity to prevent premature curing of the cyanoacrylate adhesive composition disposed with container 110. FIG. 13 shows composition 120, within a collapsible interior liner 122, being advanced to the fiber tip dispenser using knurled knob 124 which is turned to mechanically advance the composition within the container 110.

Figure 14:
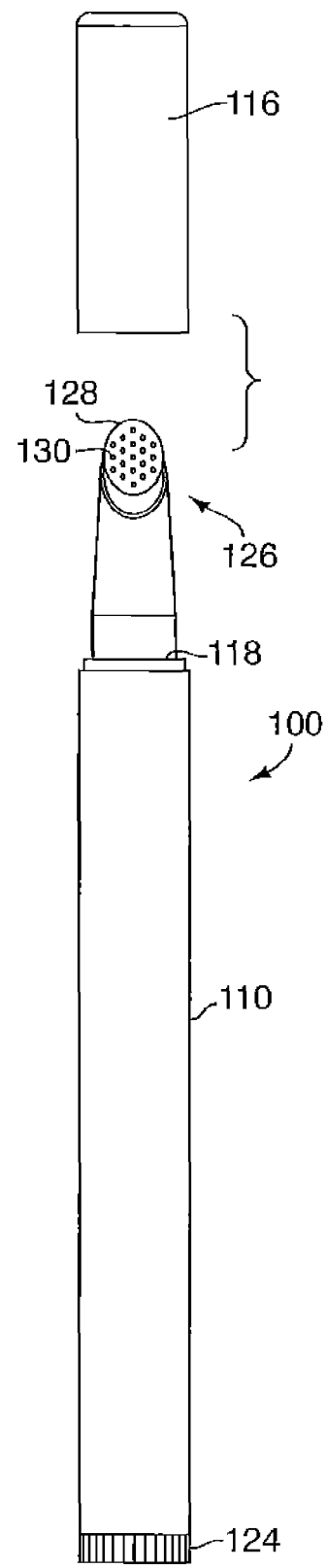
FIG. 14 is an exploded plan view of an alternative embodiment of a lipstick-type dispenser container with a cap.

In an alternative embodiment FIG. 14 shows container 100 having a generally elongated tubular shape defined by wall 110 and having a dispense end 126 defined by solid end 128 with circular apertures 130.

Figure 15:
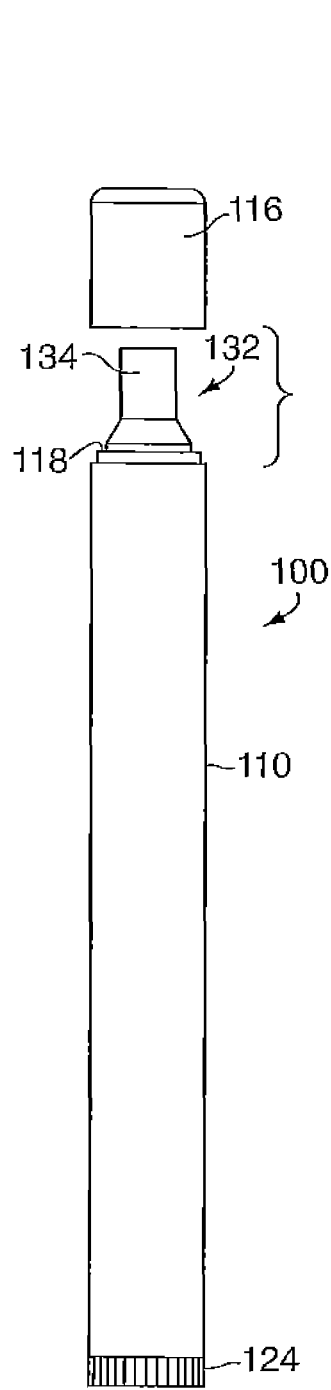
FIG. 15 is an exploded plan view of an alternative embodiment of a lipstick-type dispenser container with a cap.

In an alternative embodiment FIG. 15 shows container 100 having a generally elongated tubular shape defined by wall 110 and having a dispense end 132 defined by a dispenser 134.

Figure 16:
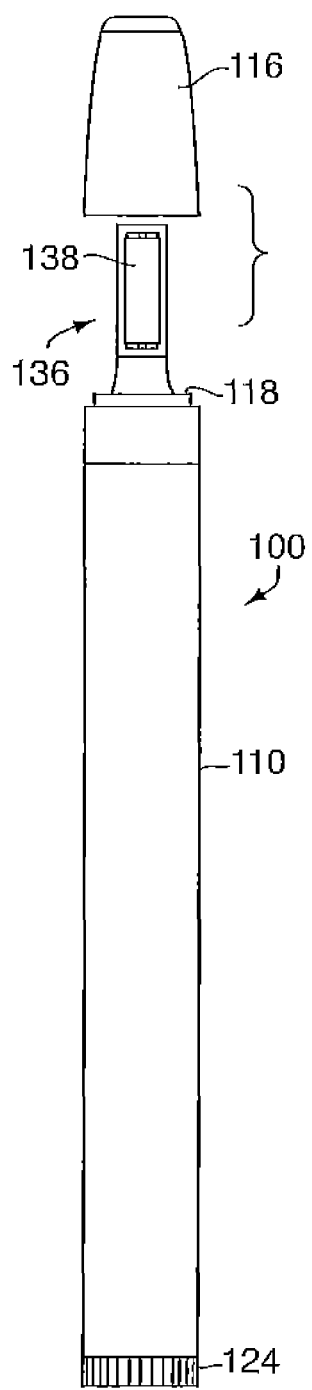
FIG. 16 is an exploded plan view of an alternative embodiment of a lipstick-type dispenser container with a cap.

In an alternative embodiment FIG. 16 shows container 100 having a generally elongated tubular shape defined by wall 110 and having a dispense end 136 defined by a vertical oriented roller 138.

Figure 17:
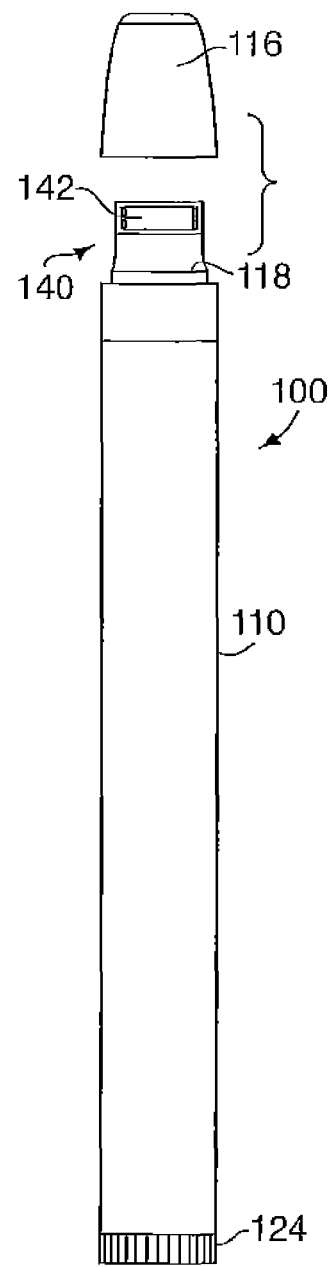
FIG. 17 is an exploded plan view of an alternative embodiment of a lipstick-type dispenser container with a cap.

In an alternative embodiment FIG. 17 shows container 100 having a generally elongated tubular shape defined by wall 110 having a dispense end 140 defined by a horizontally oriented roller 142.

Figure 18:
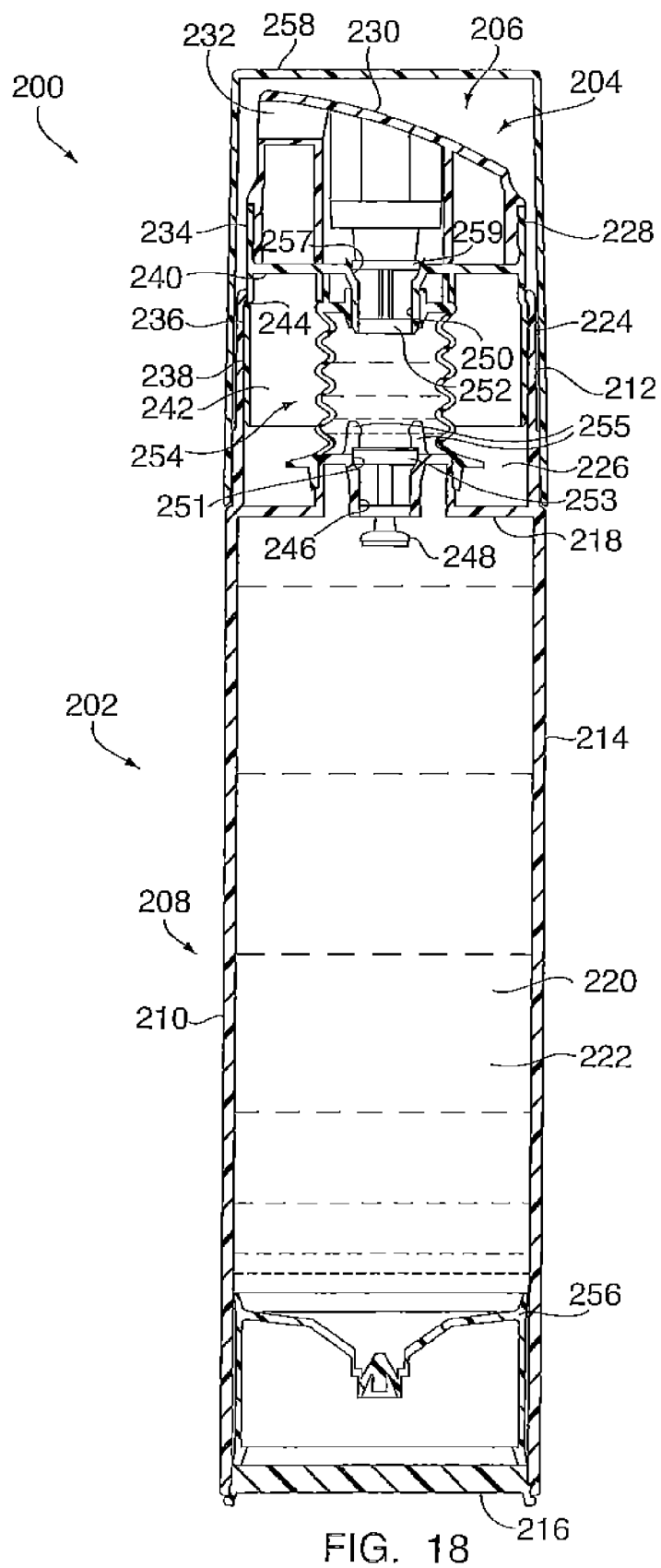
FIG. 18 is a sectional view of an alternative embodiment of a dispenser container with a cap identifying an interior cavity within which is the non-flowable cyanoacrylate adhesive composition.
Figure 19:
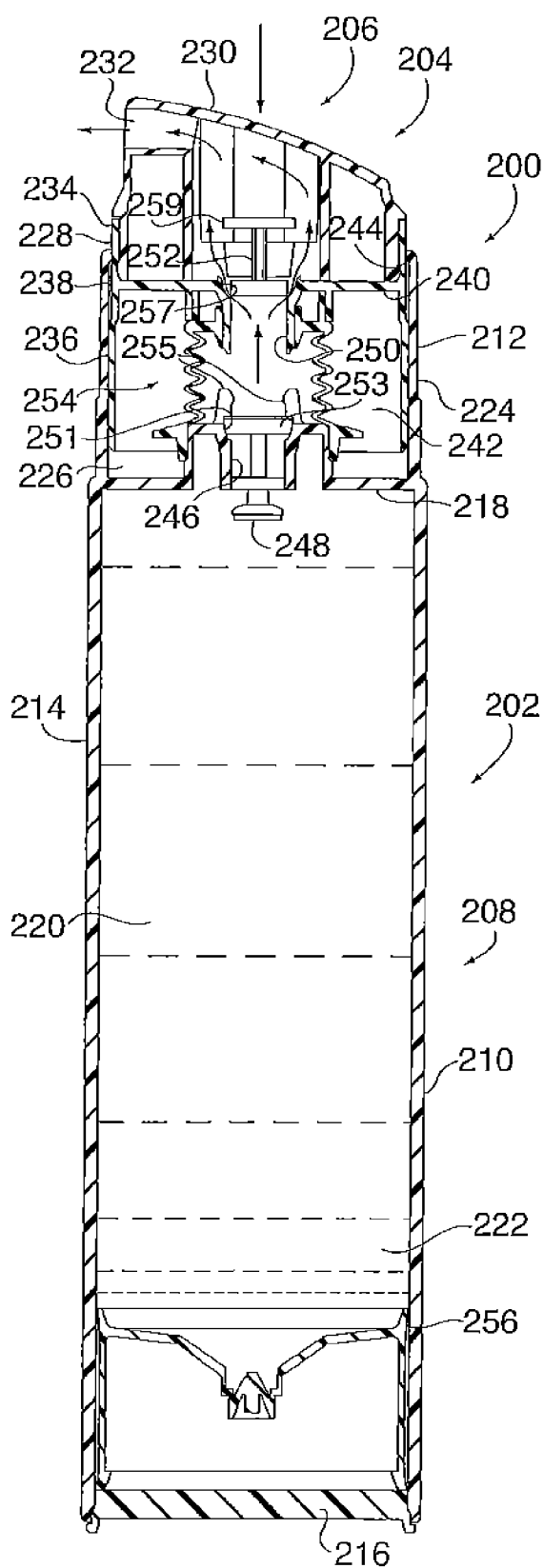
FIG. 19 is a sectional view of the dispenser container of FIG. 18 with the dispenser actuator in a dispensing position.
Figure 20:
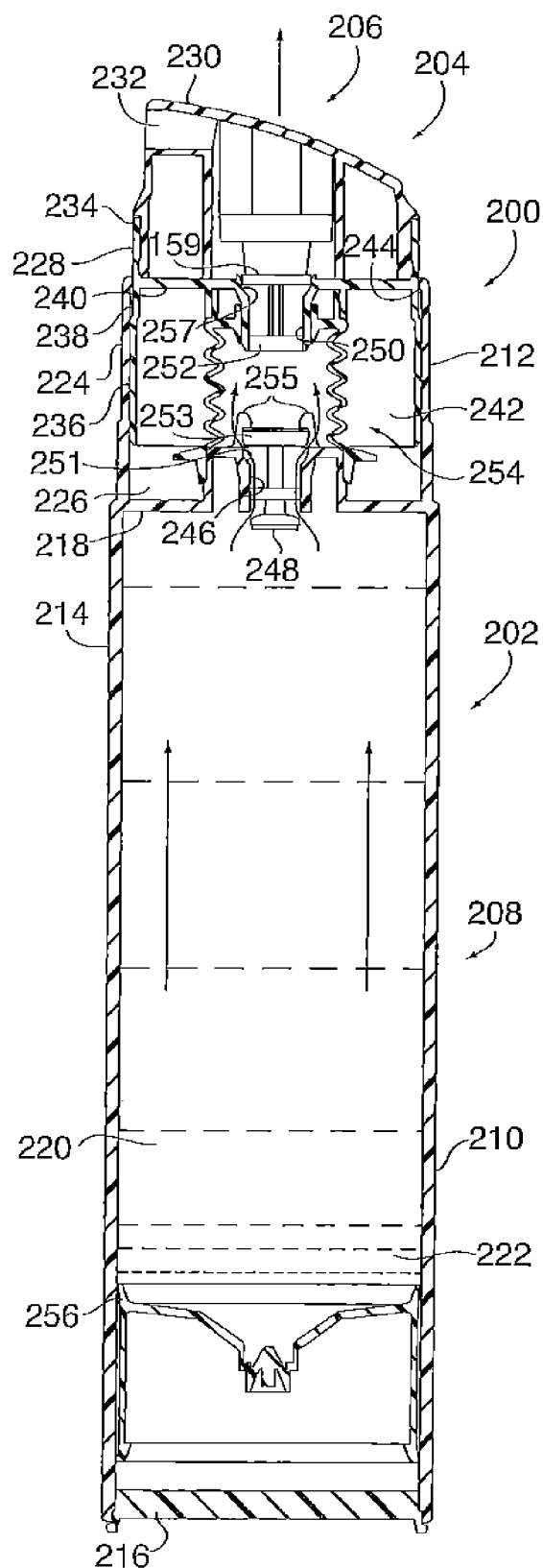
FIG. 20 is a sectional view of the dispenser container of FIG. 18 with the dispenser actuator in a fill position.
Figure 21:
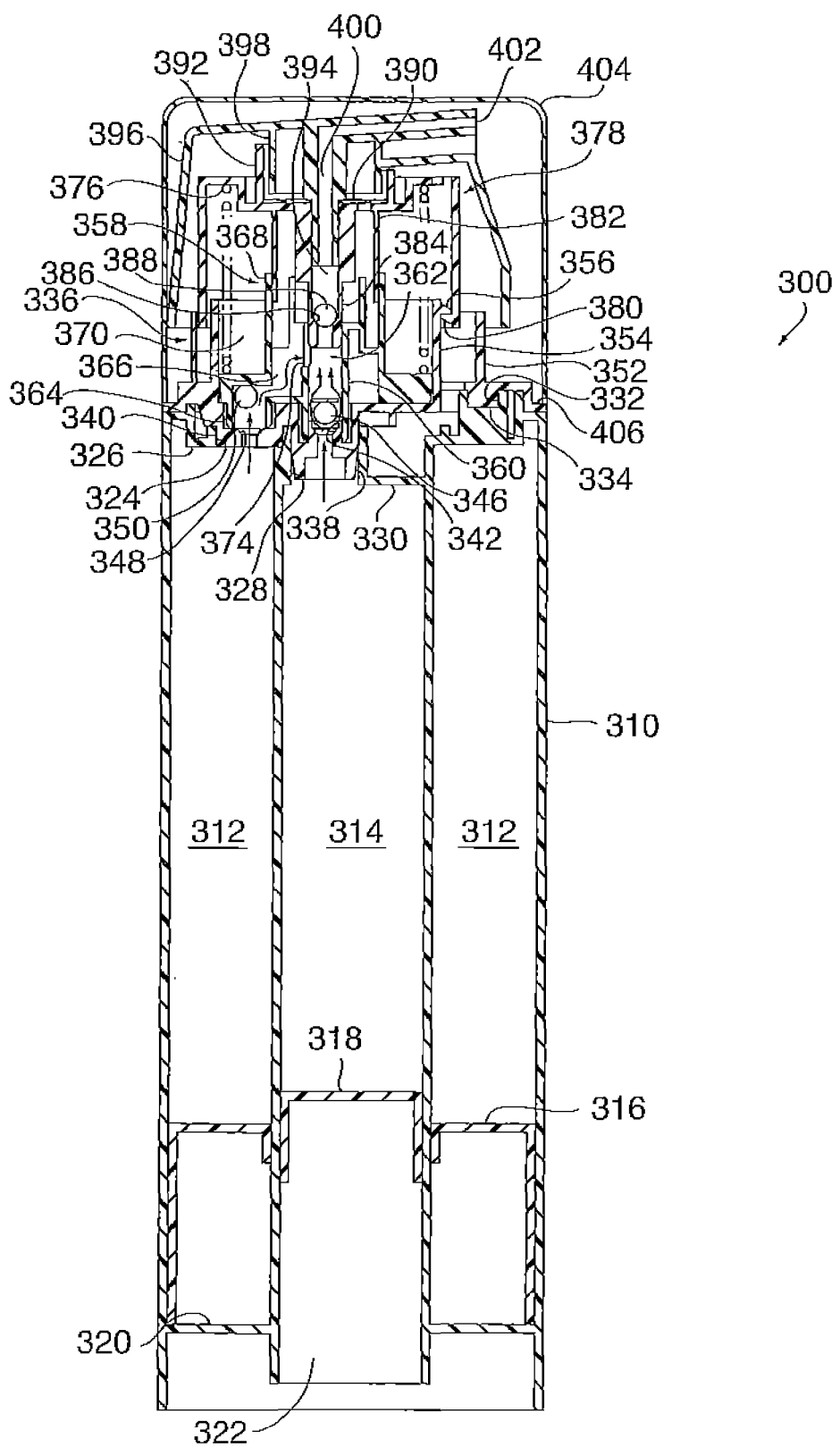
FIG. 21 is a sectional view of an alternative embodiment of a dispenser container with a cap identifying an interior cavity within which is two different non-flowable cyanoacrylate adhesive compositions to be mixed and dispensed as one composition.
Figure 22:
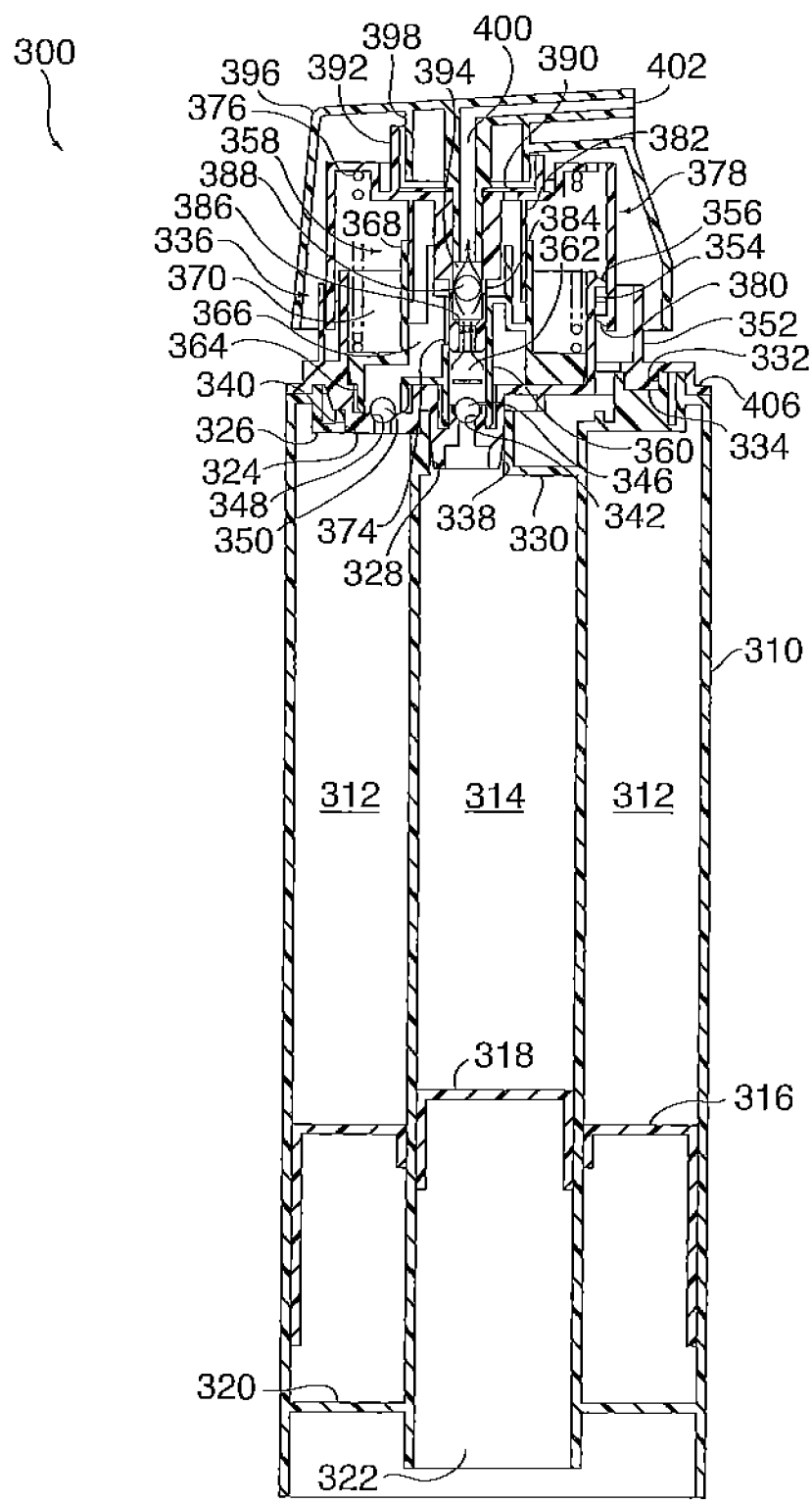
FIG. 22 is a sectional view of the dispenser container of FIG. 21 with the dispenser actuator in a mixing position.
Figure 23:
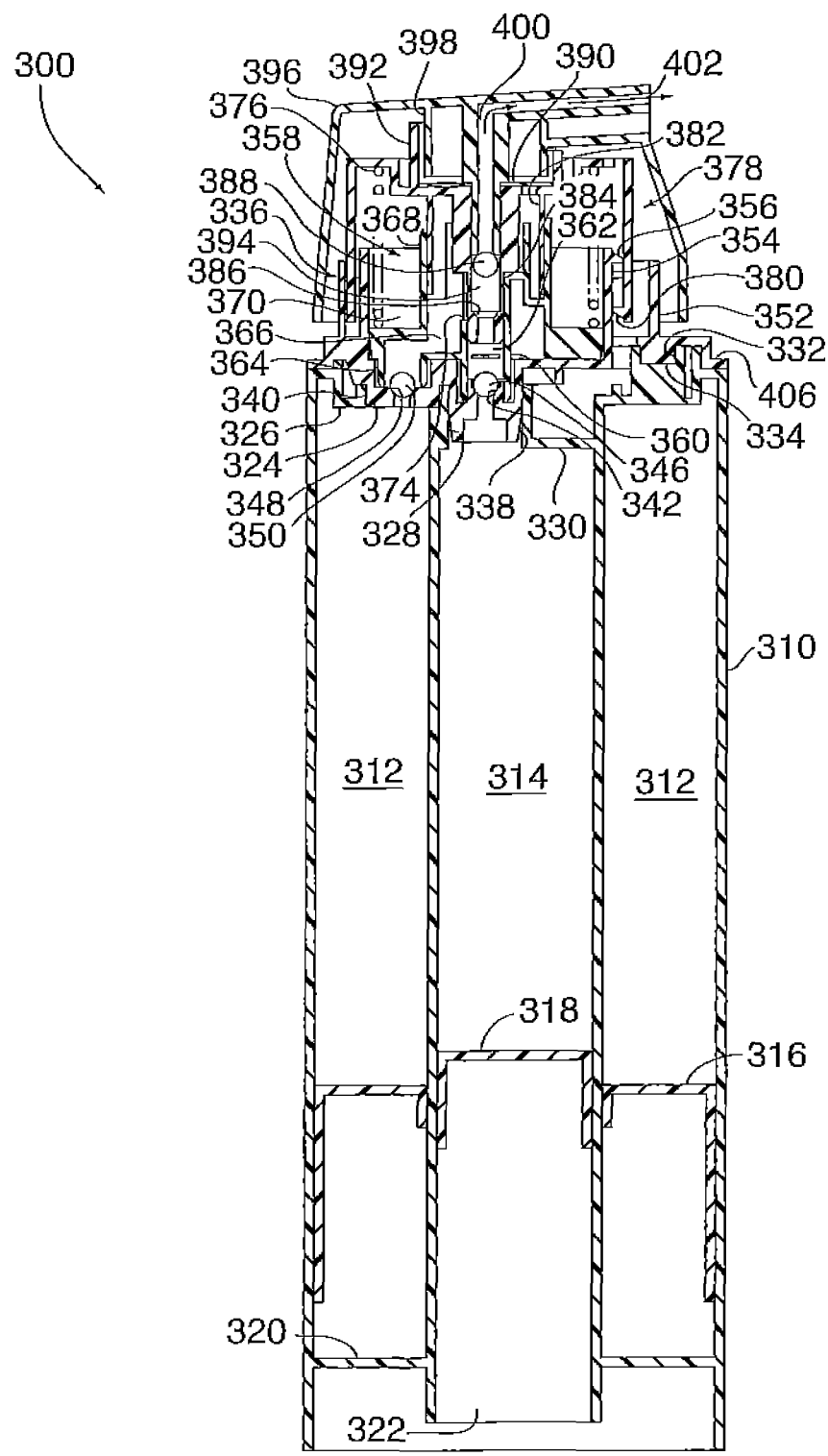
FIG. 23 is a sectional view of the dispenser container of FIG. 21 with the dispenser actuator in a dispensing position.
Figure 24:
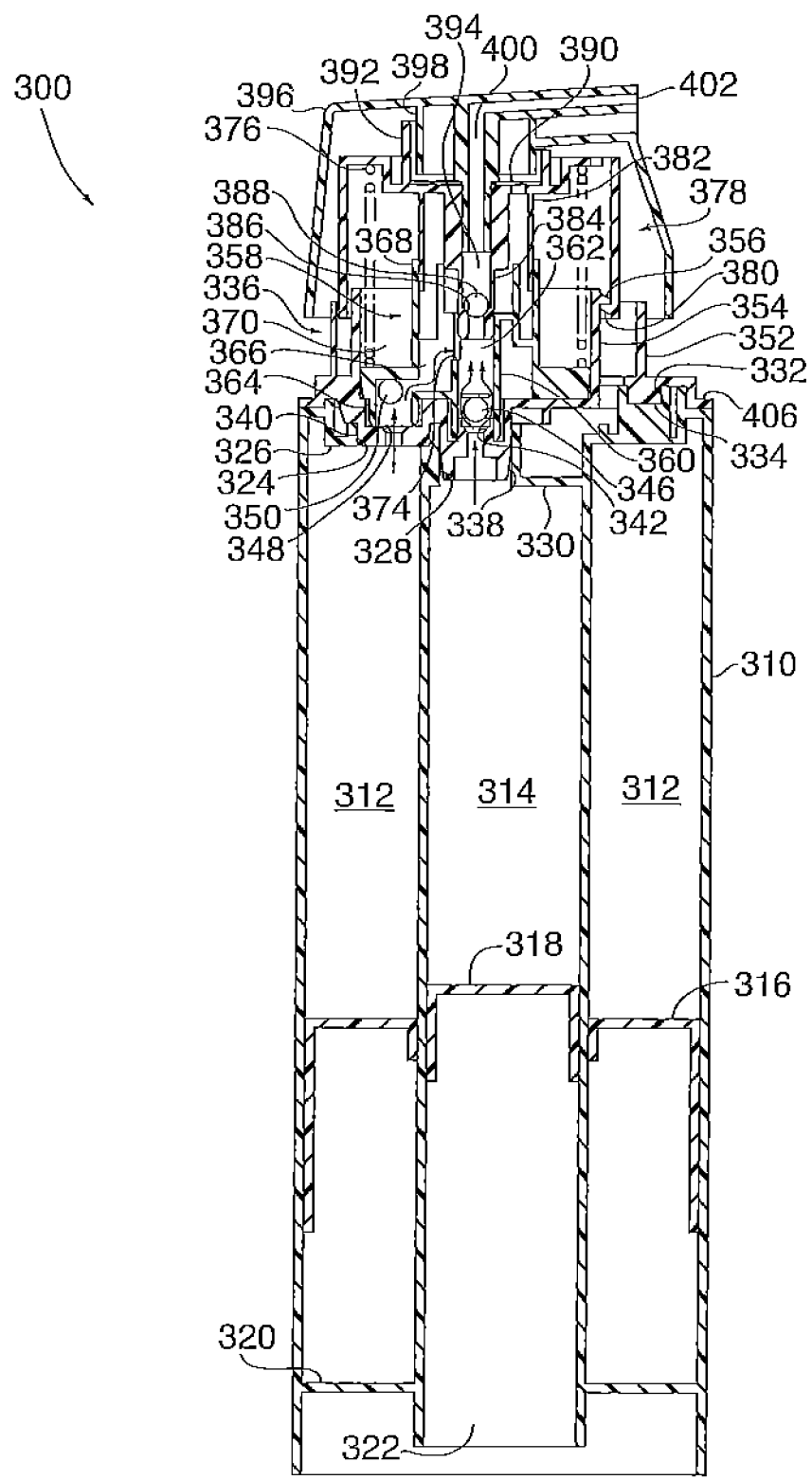
FIG. 24 is a sectional view of the dispenser container of FIG. 21 with the dispenser actuator in a fill position.

In a further alternative embodiment, FIGS. 18-20 show a dispenser 200 having a generally cylindrical container 202 and having a dispensing end 204 defined by an actuator 206 for dispensing a flowable liquid. The container 202 has a generally elongated tubular shaped body 208, consisting of a lower body portion 210 and an upper body portion 212. The lower body portion is defined by a generally cylindrical wall 214, a bottom plate 216 and a top wall 218 defining a lower body cavity 220 for containing, under pressure, a flowable liquid 222. The upper body portion 212 consists of a generally cylindrical upwardly depending open wall portion 224 defining an upper body cavity 226.

The actuator 206 consists of an actuator body 228 and dispensing head 230 with an aperture 232 for releasing liquid upon activation of the dispense head. The actuator body 228 has an open upper portion 234 for receiving the dispensing head 232 in fixed relation thereto and a downwardly depending open lower portion 236 defined by a lower portion generally cylindrical wall 238 and a top wall 240 defining an actuator body lower portion cavity 242. The actuator body lower portion 236 is slideably received in the upper body portion 212 and retained therein by an upper lip 244 on the upper body portion.

The lower body portion top wall 218 has a valve receiving opening 246 for slideably receiving therein a lower valve 248. The actuator body lower portion top wall 240 has a valve receiving opening 250 for slideably receiving therein an upper valve 252. A bellows assembly 254 is disposed between the actuator body lower portion top wall and lower body portion top wall 218,240 to retain flowable liquid in a pressurized condition.

The lower body portion cavity 220 retains a piston 256 in sliding relation to maintain the flowable liquid 222 in a pressurized condition in cavity 220.

Cap 258 as shown is designed for closingly engaging the container upper body cylindrical wall portion 224.

The lower valve opening 246 consists of a valve seat 251 for sealingly engaging a lower valve member 253 on lower valve 248. Lower body portion top wall 218 also has four (only two shown) valve retaining members 255 for limiting the upper movement of lower valve 248.

The upper valve opening 250 consists of a valve seat 257 for sealingly engaging an upper valve member 259 on upper valve 252.

In a further embodiment, FIGS. 21-24 show a dispenser 300 having a substantially cylindrical body unit 310. The body until 310 includes an exterior cylindrical fluid reservoir 312 and an interior cylindrical fluid reservoir 314. Both reservoirs 312, 314 comprise the entire length of the body until 310. The exterior cylindrical fluid reservoir 312 includes an exterior circular base plate 316 defining a lower wall of the exterior cylindrical fluid reservoir 312. The interior fluid reservoir 314 includes an interior circular base plate 318 defining the lower wall of the interior cylindrical fluid reservoir 314. The body unit includes a circular base plate 320 that defines the bottom portion of the body unit 310. The base plate 320 further includes a circular opening 322 for receiving the interior circular base plate 318.

The external cylindrical fluid reservoir 312 has an external fluid opening 324 in the upper wall portion 326 of the external cylindrical fluid reservoir 312. Likewise, the internal cylindrical fluid reservoir 314 has an internal fluid opening 328 in the upper wall portion 330 of the internal cylindrical fluid reservoir 314. Additionally, there is a detent 332 and corresponding alignment pin 334 to aid in proper alignment of a valve assembly until 326.

The valve assembly unit 336 is pressure mounted atop the body unit 310. The valve assembly unit 336 includes an interior dip tube 338, which is substantially similar in size to the internal fluid opening 328. The valve assembly unit 336 also includes an exterior dip tube 340, which is substantially similar in size to the internal fluid opening 324. The fluid openings and corresponding dip tubes each have a different diameter to ensure that there is only one correct orientation of the valve assembly unit 336 with the body unit 310.

The valve assembly unit 336 has an interior valve seat 342, with an interior check ball 346 on the valve seat 342. Additionally, the valve assembly 336 also comprises an exterior valve seat 348, with an exterior check ball 350 on the exterior valve seat 348. The valve assembly unit 336 includes an exterior cylindrical retaining wall 352 and an interior cylindrical retaining wall 354 which includes a plurality of retaining tabs 356.

A mixing unit 358 is pressure fit within the interior retaining wall 354. The mixing unit 358 includes an interior dip tube 360, which connects to the valve assembly unit 336, and creates a first mixing chamber 362. The mixing unit 358 also includes an exterior dip tube 364 that connects to the valve assembly unit 336 and forms a second mixing chamber 366. The mixing unit 358 includes a mixing unit exterior retaining wall 368 which along with the interior retaining wall 354 forms the lower portion of a spring housing cavity 370 which houses spring 376. The mixing unit and interior dip tube 360 has a slit creating a passage 374 connecting the second mixing chamber 366 with the first mixing chamber 362.

An actuator body unit 378 is substantially cylindrical and is pressure mounted to the mixing unit 358. The actuator body unit 378 is secured to the mixing unit 358 by multiple retaining tabs 380 that interlock with the valve assembly unit retaining tabs 356. The actuator body unit 378 has an exterior actuator retaining wall 382, which fits within the mixing unit exterior retaining wall 368. The actuator body unit defines the upper wall section of the second mixing chamber 366. The actuator body unit 378 also has an actuator interior dip tube 384, which is cylindrical in shape, and includes a valve seat 386 and a check ball 388. The actuator body unit 378 has a gasket 390 and a cylindrical upper retaining wall 392 that creates a reservoir. The cylindrical upper retaining wall 392 has a portion removed from the circumference creating a passage way for an upper outlet channel 394.

A substantially cylindrical dispensing head 396 is pressure mounted to the actuator body unit 378. The dispensing head 396 has a substantially cylindrical exterior retaining wall 398, which fits within the cylindrical upper retaining wall 392. The dispensing head has a lower outlet channel 400 that is connected to the upper outlet channel 394 and dispensing head aperture 402. Additionally there is a substantially cylindrical cap 404 that is pressure mounted to the body unit 310, and surrounds the dispensing head and is mounts to a cap ridge 406.

Figure 25:
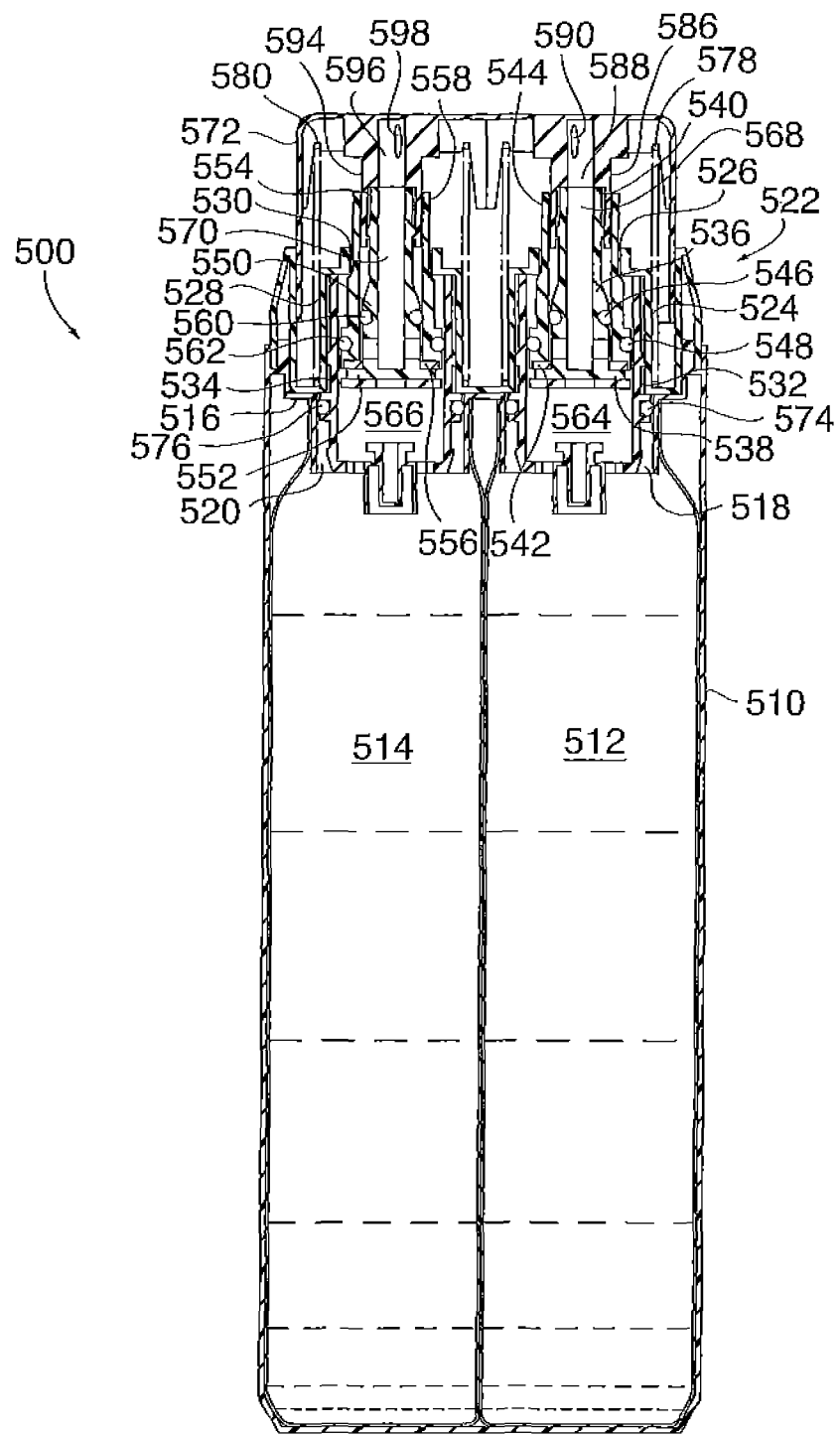
FIG. 25 is a sectional view of an alternative embodiment of a dispenser container with a cap identifying an interior cavity within which is two different non-flowable cyanoacrylate adhesive compositions to be dispensed as two compositions.
Figure 26:
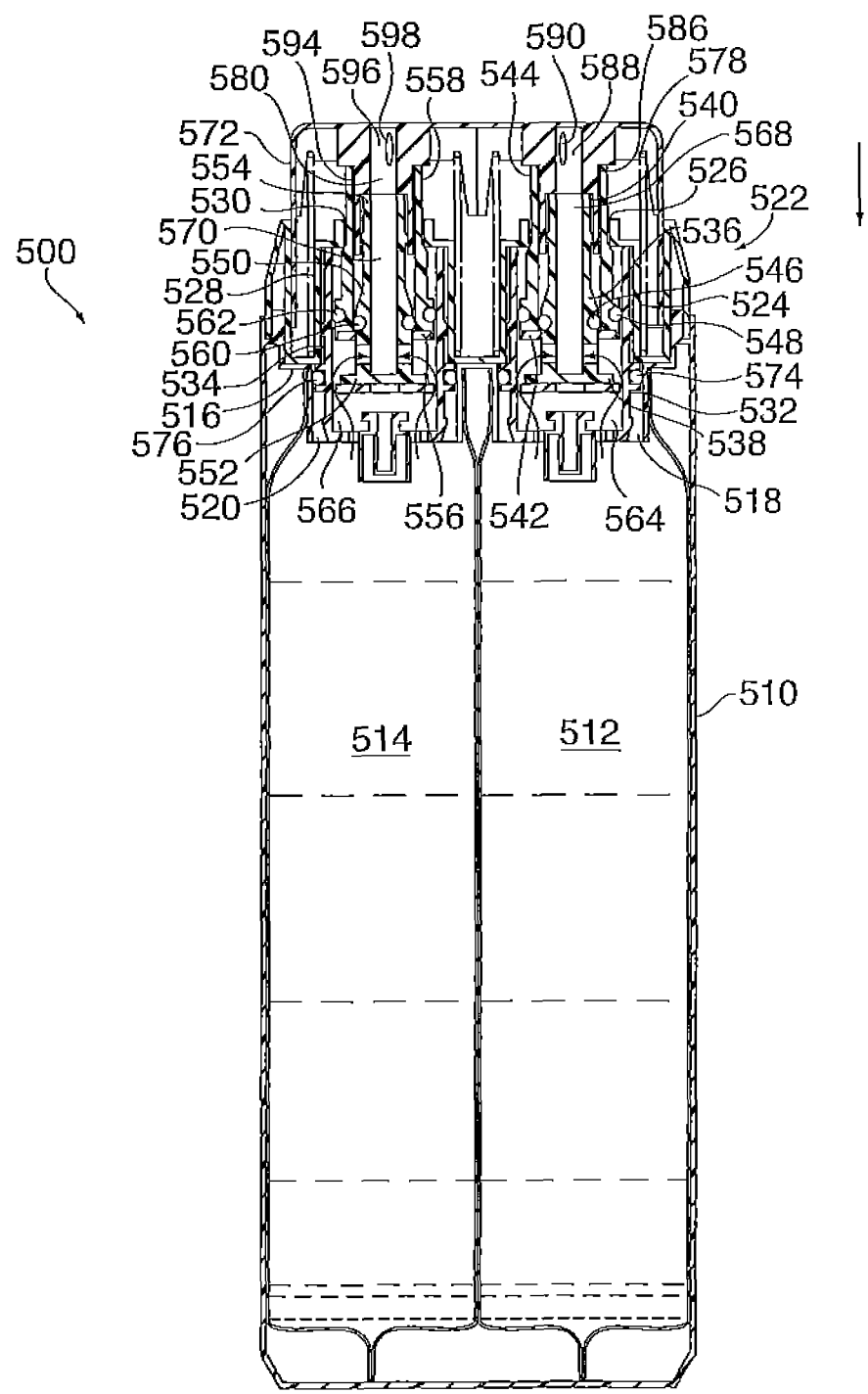
FIG. 26 is a sectional view of the dispenser container of FIG. 25 with the dispenser actuator in a first fill position.
Figure 27:
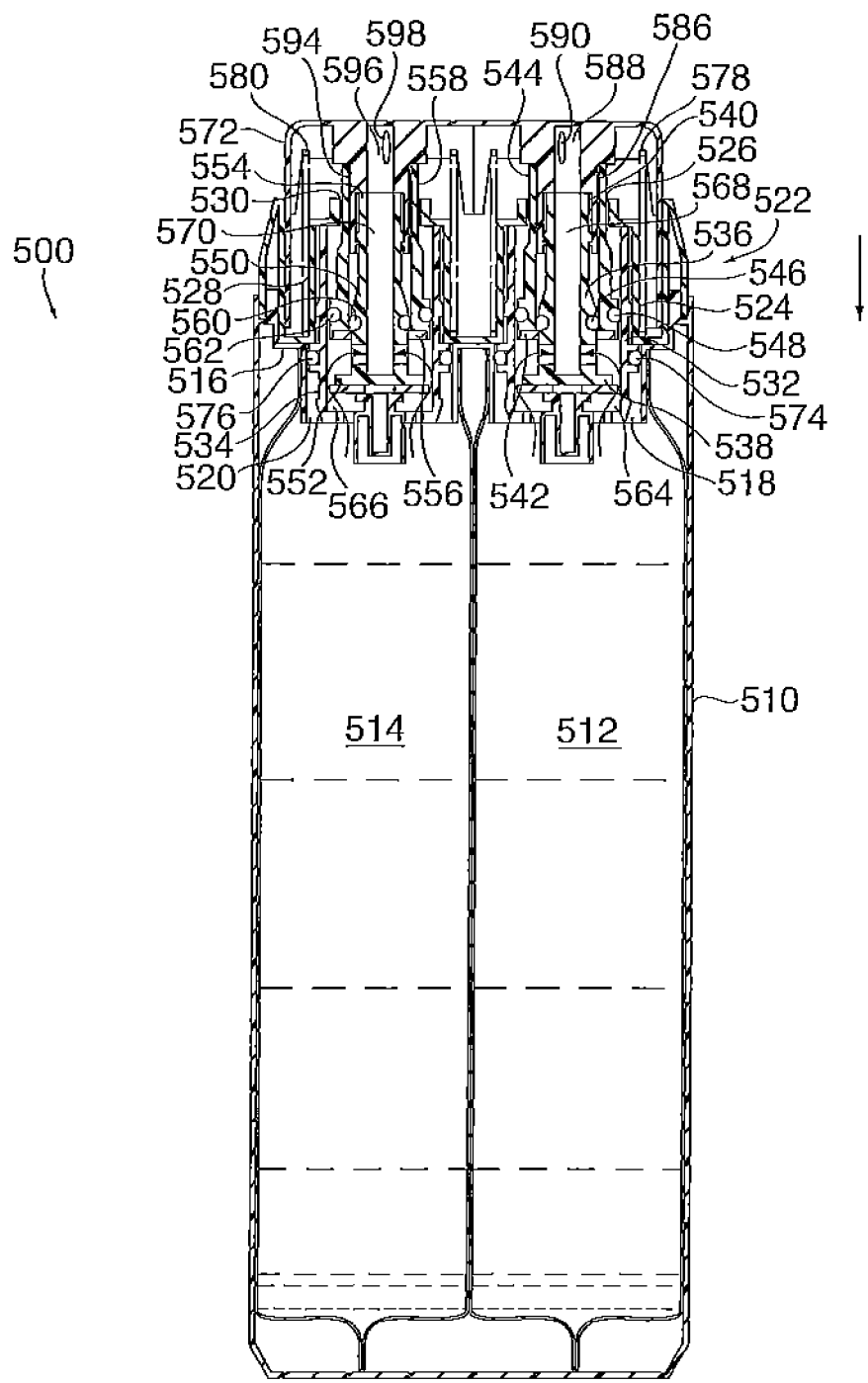
FIG. 27 is a sectional view of the dispenser container of FIG. 25 with the dispenser actuator in a second fill position.

In an alternative embodiment, FIG. 25 shows a dispenser 500 having a substantially cylindrical body unit 510. The body unit is 510 is divided into a first hemicylinder fluid reservoir 512 and a second hemicylinder fluid reservoir 514. An upper wall 516 of the body unit has a first circular opening 518 and a second circular opening 520. The upper wall of the body unit 510 further includes two retaining slots (not shown) for receiving retaining tabs (not shown).

A valve assembly unit 522 is mounted to the body unit 510 and secured by the interlocking of the tabs (not shown) and slots (not shown). The valve assembly unit 522 also includes a first actuator housing 524 having a first cylindrical opening 524 and a second actuator housing 528 having a second cylindrical opening 530. A first modular casing 532 is pressure fit into the first actuator housing 524. A second modular casing 532 further includes a first interior plunger 536, having a first plunger head 538 and first plunger shaft 540. The first plunger head 538 further includes a first gasket 542 for proving a watertight seal between the first interior plunger 536 and a first exterior retaining wall 544. Additionally, there is a first interior O-ring 546 for providing a watertight seal at the base of the first exterior retaining wall 544. The first exterior retaining wall 544 is pressure fit within the first modular casing 532 and further includes an exterior O-ring 548 for providing a watertight seal between the first exterior retaining wall 544 and the first modular casing 532.

Similarly, the second modular casing 534 further includes a second interior plunger 550, having a second plunger head 552 and a second plunger shaft 554. The second plunger head 552 further includes a second gasket 556 for proving a watertight seal between the second interior plunger 550 and a second exterior retaining wall 558. Additionally, there is a second interior O-ring 560 for providing a watertight seal at the base of the second exterior retaining wall 558. The exterior retaining wall 558 is pressure fit within the second modular casing 534 and further includes an exterior O-ring 562 for providing a watertight seal between the second exterior retaining wall 558 and the second modular casing 534.

The modular casings 532, 534 define an upper wall portion 516 of the fluid reservoirs 512, 514 respectively. The plunger heads 538, 552 define an upper wall portion for fluid chambers 564 and 566 respectively. The interior plungers 536, 550 also have small openings and are hollow to provide a first pathway 568 and a second pathway 570 connecting the fluid chambers 564 and 566 to the dispensing head 572. Additionally, the first modular casing 532 has a second exterior O-ring 576.

Coiled around the actuator housing units 524, 528 are first spring 578 and second spring 580.

Figure 28:
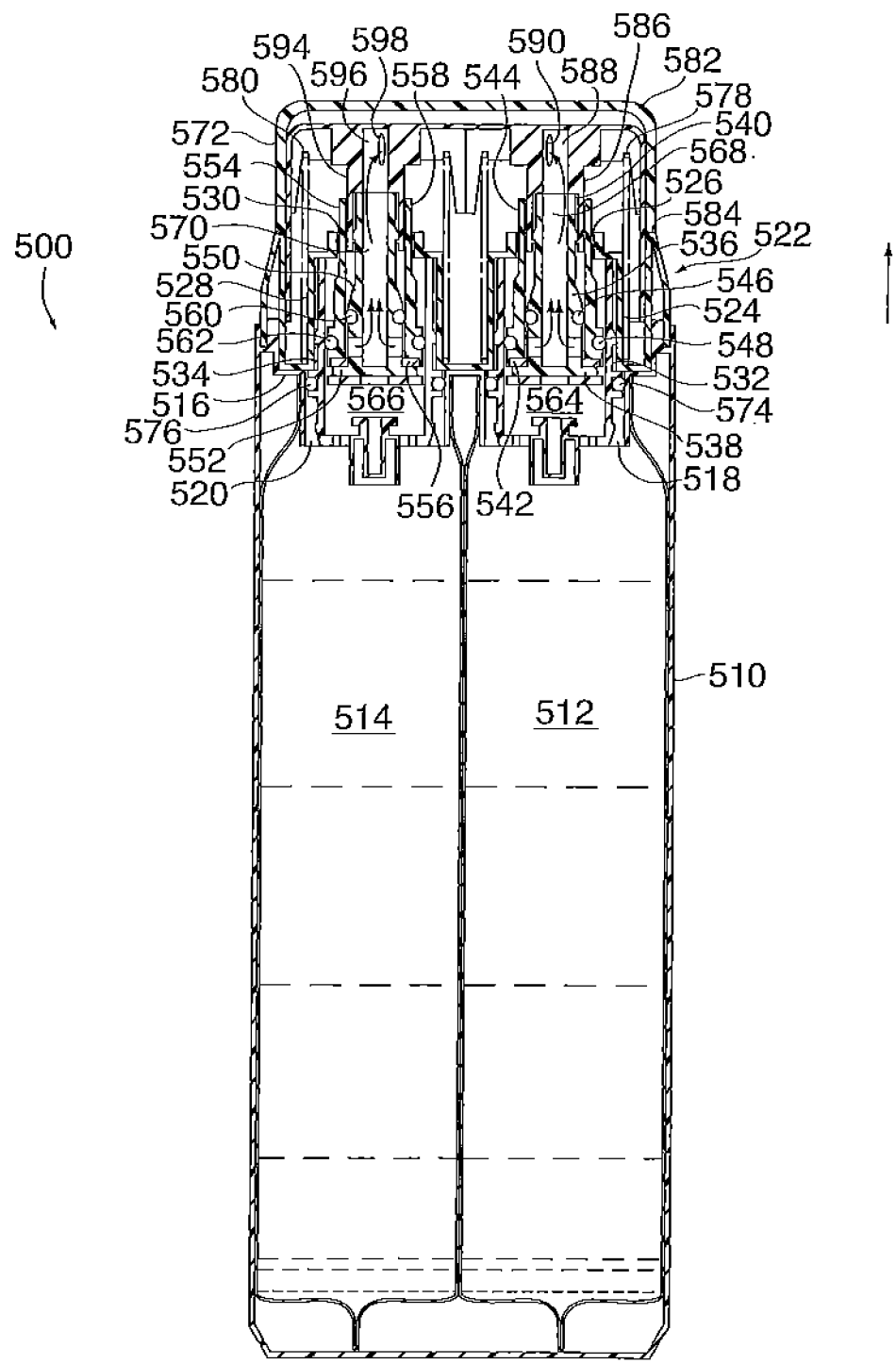
FIG. 28 is a sectional view of the dispenser container of FIG. 25 with the dispenser actuator in a dispensing position.

Additionally, and as shown in FIG. 28, there is a substantially cylindrical cap 582 that is pressure mounted to the body unit 510 which surrounds the dispensing head 572 and mounts to a cap ridge 584.

Figure 29:
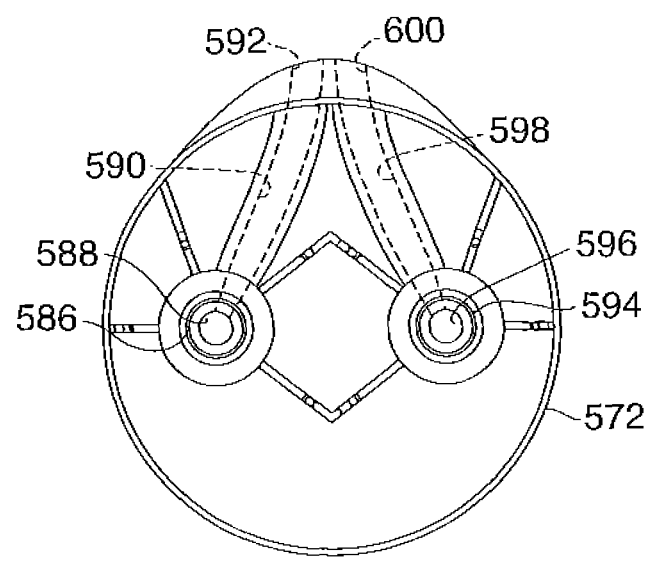
FIG. 29 is a bottom view of the dispenser actuator of FIG. 25.

Referring to FIG. 29, the dispensing head 572 has a first down tube 586 that receives the first pathway 568, thus defusing a first lower outlet channel 588. The first lower outlet channel 588 connects to a first upper outlet channel 590, and arcs toward a first aperture 592.

Likewise, the dispensing head 572 has a second down tube 594 that receives the second pathway 570, thus defining a second lower outlet channel 596. The second lower outlet channel 596 connects to a second upper outlet channel 598, and arcs toward a second aperture 600. The apertures 592, 600 are positioned next to each other such that the fluids are dispensed from separate reservoirs, but are still dispensed simultaneously to the user.

Figure 30:
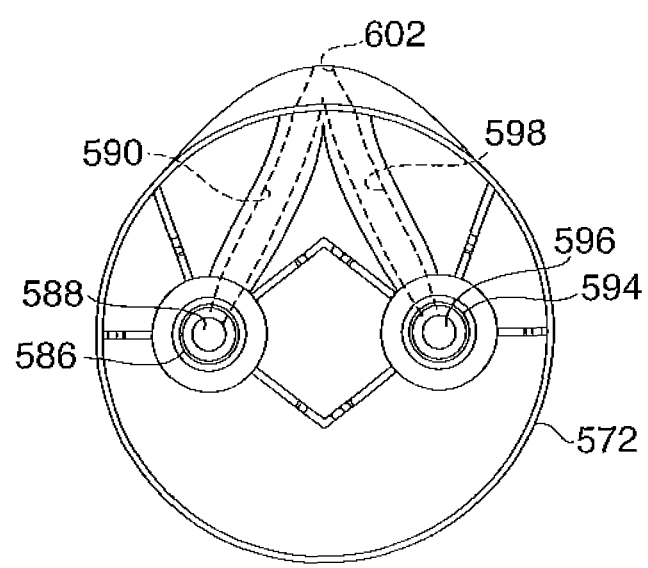
FIG. 30 is a bottom view of an alternative dispenser actuator for dispensing the compositions as one.

Referring to FIG. 30, in another embodiment, the first and second upper outlet channels 590, 598 respectively could be combined into a single aperture 602. This would function similarly to the previous embodiment, except that the fluids would be combined in the upper outlet channels 590, 598 just prior to exiting the dispensing head 572 through the single aperture 602.

Other useful dispensers or applicators are disclosed in International Patent Publication No. WO 01/91915, the contents of which are incorporated herein by reference. The applicators include a seal formed between the dispenser opening and its mating cap to prevent premature polymerization of cyanoacrylate adhesive compositions without the dispenser or container body.

The following non-limiting examples are intended to further illustrate the present invention.

EXAMPLES

Example 1

Cyanoacrylate compositions A and B were prepared by incorporating the indicated amount of polymeric material in powder form and thickener and mixing in a dispenser for about 30 seconds, though 5 minutes or longer may be desirable, until the polymeric powder is dispersed in the cyanoacrylate composition. The cyanoacrylate composition may optionally be slightly heated prior to incorporation of the polymeric material, e.g., at about 122° F. (50° C.).

TABLE I

INVENTIVE NON-FLOWABLE CYANOACRYLATE COMPOSITIONS

| Component | | Composition (wt. %) | |
|---|---|---|---|
| Type | Identity | A | B |
| CA | Ethyl cyanoacrylate monomer | 75 | 75 |
| Thickener | Polymethylmethacrylate | 7 | 7 |
| Polymeric Material | trihydroxystearin[1] | 15 | — |
| Polymeric Material | hydroxylated caster oil derivative[2] | — | 15 |
| Iinhibitor | $BF_3$, ppm | 18 | 18 |

[1]THIXIN R
[2]THIXIN E

Each of the inventive compositions were dispensed into lipstick-type aluminum dispenser packages and postbaked at about 122° F. (50° C.) or aged overnight at that temperature. In the present invention, these materials allow for a normally room temperature flowable composition, such as a cyanoacrylate composition, to be rendered non-flowable at room temperature and remain non-flowable up to temperatures of 180° F. (82° C.) or more. In each of the inventive compositions 1-5, the resultant composition, even after accelerated heat aging, was a self-supporting adhesive mass, exhibiting a soft non-flowable consistency which was easily dispensed onto substrates by wiping the dispenser across the intended surface.

Lap shear specimens were prepared for these compositions using standard steel substrates each having the same amount of composition placed onto the substrate. The inventive non-flowable compositions were applied by manual application from a lipstick-type dispenser. The prepared samples were cured at temperatures given below. The specimens were pulled at 0.5 inches/minute per ASTM D1002. The inventive compositions were compared to a control, i.e., a flowable cyanoacrylate composition. The lap shear strengths in psi were recorded, as follows in Table II.

TABLE II

Lap Shear Strength Tests (psi)

| Compositions | Curing Conditions | Lap Shear Strength (psi) |
| --- | --- | --- |
| Inventive Composition A | Room temperature, 24 hours | 2,800 |
| Inventive Composition B | Room temperature, 24 hours | 3,000 |
| Control-A (liquid cyanoacrylate)[1] | Room temperature, 24 hours | 3,400 |
| Control-B (gel cyanoacrylate)[2] | Room temperature, 24 hours | 3,400 |
| Control-C (gel cyanoacrylate)[3] | Room temperature, 24 hours | 3,200 |

[1]A liquid in the uncured state having a 15 to 25 mPas (cP)Viscosity, Brookfield - LVF, 25° C., Spindle #1, Speed 30 rpm. Commercially available as LOCTITE ® 406.
[2]A gel in the uncured state having a 15,000 to 40,000 mPas (cP) Viscosity, Brookfield - RVF, 25° C., Spindle #TC, Speed 20 rpm, Helipath. Commercially available as LOCTITE ® 409.
[3]A gel in the uncured state having a 18,000 to 40,000 mPas (cP) Viscosity, Brookfield - RVT, 25° C., Spindle #TC, Speed 20 rpm, Helipath. Commercially available as LOCTITE ® 454.

The inventive compositions had lap shear strengths comparable to commercially available liquid and gel cyanoacrylate products.

The inventive compositions were stable when stored in containers, such as aluminum tubes. Accelerated stability tests were done at 82° C., as follows:

TABLE III

Accelerated Stability Tests

| Compositions | Storage Conditions | Stability[4] (days) |
| --- | --- | --- |
| Inventive Composition A | 82° C., aluminum tubes | >14 |
| Inventive Composition B | 82° C., aluminum tubes | >14 |
| Control-A (liquid cyanoacrylate)[1] | 82° C., aluminum tubes | >14 |
| Control-B (gel cyanoacrylate)[2] | 82° C., aluminum tubes | >14 |
| Control-C (gel cyanoacrylate)[3] | 82° C., aluminum tubes | >14 |

[1]A liquid in the uncured state having a 15 to 25 mPas (cP)Viscosity, Brookfield - LVF, 25° C., Spindle #1, Speed 30 rpm. Commercially available as LOCTITE ® 406.
[2]A gel in the uncured state having a 15,000 to 40,000 mPas (cP) Viscosity, Brookfield - RVF, 25° C., Spindle #TC, Speed 20 rpm, Helipath. Commercially available as LOCTITE ® 409.
[3]A gel in the uncured state having a 18,000 to 40,000 mPas (cP) Viscosity, Brookfield - RVT, 25° C., Spindle #TC, Speed 20 rpm, Helipath. Commercially available as LOCTITE ® 454.
[4]Equivalent to about two years and greater shelf life at room temperature.

The inventive compositions had shelf lives comparable to commercially available liquid and gel cyanoacrylate products.

What is claimed is:

1. An article of manufacture comprising:
   a. a dispensing container for housing and dispensing a non-flowable adhesive composition, said container comprising a generally elongate hollow body having first and second ends, with one of said ends defining a dispense opening; and
   b. a cyanoacrylate composition within said container, said composition comprising:
      (i) at least one cyanoacrylate monomer; and
      (ii) a polymeric matrix selected from the group consisting of hydroxy-modified aliphatic hydrocarbons, polyester-based rheological additives and combinations thereof, present in an amount sufficient to render said compositions non-flowable at temperatures up to about 180° F.

2. The article of claim 1, further comprising a brush at the dispense opening.

3. The article of claim 1, further comprising a pad at the dispense opening.

* * * * *

UNITED STATES PATENT AND TRADEMARK OFFICE
CERTIFICATE OF CORRECTION

PATENT NO. : 9,828,529 B2
APPLICATION NO. : 15/233313
DATED : November 28, 2017
INVENTOR(S) : Shabbir Attarwala Page 1 of 1

It is certified that error appears in the above-identified patent and that said Letters Patent is hereby corrected as shown below:

Column 6, Line 54: Change "polyhydroxyalkylaciylates" to -- polyhydroxyalkylacrylates --.

Column 9, Line 41: Change "  " to

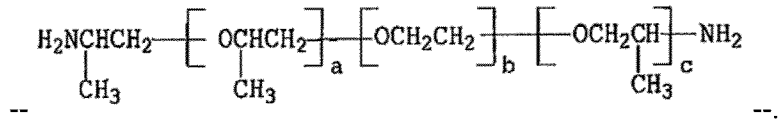 --.

Signed and Sealed this
Twenty-eighth Day of August, 2018

Andrei Iancu
*Director of the United States Patent and Trademark Office*